(12) United States Patent
Asefi et al.

(10) Patent No.: US 11,030,603 B1
(45) Date of Patent: Jun. 8, 2021

(54) SYSTEMS AND METHODS FOR DISTINGUISHING BETWEEN PROFILES IN A PASSIVE AUTHENTICATION SCHEME

(71) Applicant: Wells Fargo Bank, N.A., San Francisco, CA (US)

(72) Inventors: Azita Asefi, Vacaville, CA (US); Marcia Klingensmith, Peasant Hill, CA (US); Joon Maeng, Newcastle, WA (US); Jenny Y. Tao, Belmont, CA (US); Michael R. Thomas, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 460 days.

(21) Appl. No.: 15/632,791

(22) Filed: Jun. 26, 2017

(51) Int. Cl.
  *G06Q 20/20* (2012.01)
  *G06Q 20/40* (2012.01)
  *H04W 12/06* (2021.01)
  *H04L 29/06* (2006.01)

(52) U.S. Cl.
  CPC ........... *G06Q 20/206* (2013.01); *G06Q 20/40* (2013.01); *G06Q 20/401* (2013.01); *G06Q 20/40145* (2013.01); *H04L 63/0853* (2013.01); *H04W 12/06* (2013.01)

(58) Field of Classification Search
  CPC ........ G06Q 10/00; G06Q 40/00; G06Q 20/00; G06Q 20/42; G06Q 30/00; G06Q 30/06; G06Q 20/40; G06Q 20/20; G06Q 20/22; G06Q 30/02
  USPC ... 705/30, 41, 34, 78, 44, 39, 67, 17, 16, 35
  See application file for complete search history.

(56) References Cited

U.S. PATENT DOCUMENTS

| | | | |
|---|---|---|---|
| 7,413,113 B1 | 8/2008 | Zhu | |
| 7,437,330 B1 * | 10/2008 | Robinson | G06Q 20/04 705/67 |
| 8,170,932 B1 * | 5/2012 | Krakowiecki | G06Q 40/12 705/30 |

(Continued)

FOREIGN PATENT DOCUMENTS

| | | |
|---|---|---|
| AU | 2013207643 B2 | 1/2014 |
| WO | WO2009/082409 A1 | 7/2009 |

OTHER PUBLICATIONS

"Auto-present Passes in Apple Wallet", https://flormi.com/2016/09/automatic-selection-of-passes-on-apple-wallet/, Sep. 14, 2016. 5 pages.

*Primary Examiner* — Olusegun Goyea
(74) *Attorney, Agent, or Firm* — Foley & Lardner LLP

(57) ABSTRACT

A system, method, and apparatus of authenticating and authorizing a payment are provided. A method includes receiving authentication information gathered by a point-of-sale device from a customer initiating a payment for a transaction via the point-of-sale device; receiving context information gathered by the point-of-sale device; authenticating the customer using the received authentication information; selecting a customer payment profile from a plurality of customer payment profiles to use for the transaction, based on the received context information, wherein each customer payment profile is associated with a payment account; authorizing the payment for the transaction from the payment account associated with the selected customer payment profile; and sending, to the point-of-sale device, a notification that the customer has been authenticated and that the payment for the transaction has been authorized.

17 Claims, 8 Drawing Sheets

(56) References Cited

U.S. PATENT DOCUMENTS

| | | | |
|---|---|---|---|
| 8,195,576 B1* | 6/2012 | Grigg | G06Q 20/40145 705/67 |
| 8,548,908 B2* | 10/2013 | Friedman | G06Q 20/363 705/41 |
| 8,627,095 B2 | 1/2014 | Asano | |
| 8,973,099 B2 | 3/2015 | Reeves et al. | |
| 2002/0120587 A1* | 8/2002 | D'Agostino | G06Q 20/105 705/78 |
| 2005/0216424 A1* | 9/2005 | Gandre | G06Q 20/20 705/75 |
| 2006/0064380 A1 | 3/2006 | Zukerman | |
| 2007/0194110 A1* | 8/2007 | Esplin | G06Q 20/32 235/383 |
| 2007/0194113 A1* | 8/2007 | Esplin | G06Q 20/204 235/383 |
| 2007/0250382 A1* | 10/2007 | Beck | G06Q 30/00 705/14.21 |
| 2008/0046366 A1* | 2/2008 | Bemmel | H04L 9/32 705/44 |
| 2008/0078831 A1* | 4/2008 | Johnson | G06Q 20/3227 235/380 |
| 2008/0270929 A1* | 10/2008 | Bohn | H04L 67/34 715/772 |
| 2009/0037326 A1 | 2/2009 | Chitti et al. | |
| 2009/0112766 A1 | 4/2009 | Hammad et al. | |
| 2009/0177566 A1* | 7/2009 | Browna | G06Q 40/12 705/34 |
| 2009/0192904 A1* | 7/2009 | Patterson | G06Q 20/20 705/17 |
| 2010/0017325 A1* | 1/2010 | Scherpa | G06Q 20/20 705/39 |
| 2011/0087568 A1* | 4/2011 | Sheth | G06Q 40/12 705/30 |
| 2011/0184856 A1* | 7/2011 | Shakkarwar | G06Q 40/00 705/39 |
| 2012/0005019 A1* | 1/2012 | LeBlanc | G06Q 30/02 705/14.53 |
| 2012/0221420 A1* | 8/2012 | Ross | G06Q 40/00 705/16 |
| 2012/0330825 A1* | 12/2012 | Shakkarwar | G06Q 20/40 705/39 |
| 2013/0036036 A1* | 2/2013 | Zoldi | G06Q 30/0269 705/35 |
| 2013/0124319 A1 | 5/2013 | Hodge et al. | |
| 2013/0166398 A1 | 6/2013 | Minde | |
| 2013/0246260 A1* | 9/2013 | Barten | G06Q 20/3674 705/41 |
| 2013/0275304 A1* | 10/2013 | Kranzley | G06Q 20/3572 705/44 |
| 2014/0012704 A1* | 1/2014 | Mizhen | G06Q 30/0635 705/26.41 |
| 2014/0244494 A1 | 8/2014 | Davis et al. | |
| 2014/0279471 A1 | 9/2014 | England et al. | |
| 2014/0279474 A1* | 9/2014 | Evans | G06Q 20/40 705/41 |
| 2015/0066620 A1 | 3/2015 | Roskind | |
| 2015/0112821 A1* | 4/2015 | Giacometti | G06Q 20/20 705/16 |
| 2016/0092858 A1 | 3/2016 | Giles et al. | |
| 2016/0110529 A1* | 4/2016 | Mathew | G06F 21/32 726/7 |
| 2016/0171502 A1* | 6/2016 | Maenpaa | G06Q 20/327 705/44 |
| 2016/0182502 A1 | 6/2016 | Smith et al. | |
| 2016/0275482 A1 | 9/2016 | Zhou | |
| 2017/0004486 A1* | 1/2017 | Dhala | G06Q 20/34 |
| 2017/0024744 A1* | 1/2017 | Finch | G06Q 20/204 |
| 2017/0116604 A1* | 4/2017 | Lacoss-Arnold | G06Q 20/40 |
| 2017/0116635 A1* | 4/2017 | Gantert | G06Q 20/3224 |
| 2017/0161709 A1* | 6/2017 | Tunnell | G06Q 20/20 |
| 2018/0176727 A1* | 6/2018 | Williams | A61B 5/747 |
| 2018/0260801 A1* | 9/2018 | Chiarella | G06K 9/00288 |
| 2018/0293579 A1* | 10/2018 | Tetali | G06Q 20/3224 |
| 2018/0349911 A1* | 12/2018 | Lamaire | G06Q 20/322 |
| 2018/0365708 A1* | 12/2018 | Vincent | G06Q 30/0201 |

* cited by examiner

SYSTEMS AND METHODS FOR DISTINGUISHING BETWEEN PROFILES IN A PASSIVE AUTHENTICATION SCHEME

TECHNICAL FIELD

Embodiments of the present disclosure relate generally to the field of commercial transactions and, more specifically, to authenticating and authorizing a commercial transaction.

BACKGROUND

Payments for products and services are often completed using credit cards, debit cards, checks or cash. However, each of these payment methods requires a customer to carry a physical payment device (e.g., a card, a checkbook, or currency) to complete a transaction for products or services. Additionally, a customer may have specific payment methods or accounts that the customer uses for particular purchases, requiring the customer to carry the associated physical payment device for each of the desired payment methods or accounts.

SUMMARY

One embodiment relates to a method of authenticating and authorizing a payment. The method comprises receiving, by a financial institution computing system, authentication information gathered by a point-of-sale device from a customer initiating a payment for a transaction via the point-of-sale device, wherein the authentication information includes at least one of a biometric of the customer and an identifying number associated with the customer. The method also includes receiving, by the computing system, context information gathered by the point-of-sale device, wherein the context information comprises one or more context elements that describe the context of the transaction; authenticating, by the computing system, the customer using the received authentication information; and selecting, by the computing system, a customer payment profile from a plurality of customer payment profiles to use for the transaction, based on the received context information, wherein each customer payment profile is associated with a payment account. The method further includes authorizing, by the computing system, the payment for the transaction from the payment account associated with the selected customer payment profile, and sending to the point-of-sale device, by the computing system, a notification that the customer has been authenticated and that the payment for the transaction has been authorized.

Another embodiment relates to a system for authenticating and authorizing a payment. The system includes a processor coupled to a non-transitory storage medium including instructions stored thereon. When executed by the processor, the instructions cause the system to receive authentication information gathered by a point-of-sale device from a customer initiating a payment for a transaction via the point-of-sale device, wherein the authentication information includes at least one of a biometric of the customer and an identifying number associated with the customer. The instructions also cause the system to receive context information gathered by the point-of-sale device, wherein the context information comprises one or more context elements that describe the context of the transaction; authenticate the customer using the received authentication information; and select a customer payment profile from a plurality of customer payment profiles to use for the transaction, based on the received context information, wherein each customer payment profile is associated with a payment account. The instructions further cause the system to authorize the payment for the transaction from the payment account associated with the selected customer payment profile, and send, to the point-of-sale device, a notification that the customer has been authenticated and that the payment for the transaction has been authorized.

Another embodiment relates to a method of authenticating and authorizing a payment. The method includes gathering, by a point-of-sale device, authentication information from a customer initiating a payment for a transaction by the point-of-sale device, wherein the authentication information includes at least one of a biometric of the customer and an identifying number associated with the customer. The method also includes gathering, by the point-of-sale device, context information, the context information comprising one or more context elements that describe a context of the transaction, and sending, by the point-of-sale device, the authentication information and the context information to a financial institution computing system. The method further includes receiving, by the point-of-sale device, a notification from the financial institution computing system that the customer has been authenticated by the computing system and that the payment for the transaction is authorized by the computing system, and displaying, by the point-of-sale device, the notification to the customer.

DETAILED DESCRIPTION

Figure 1:
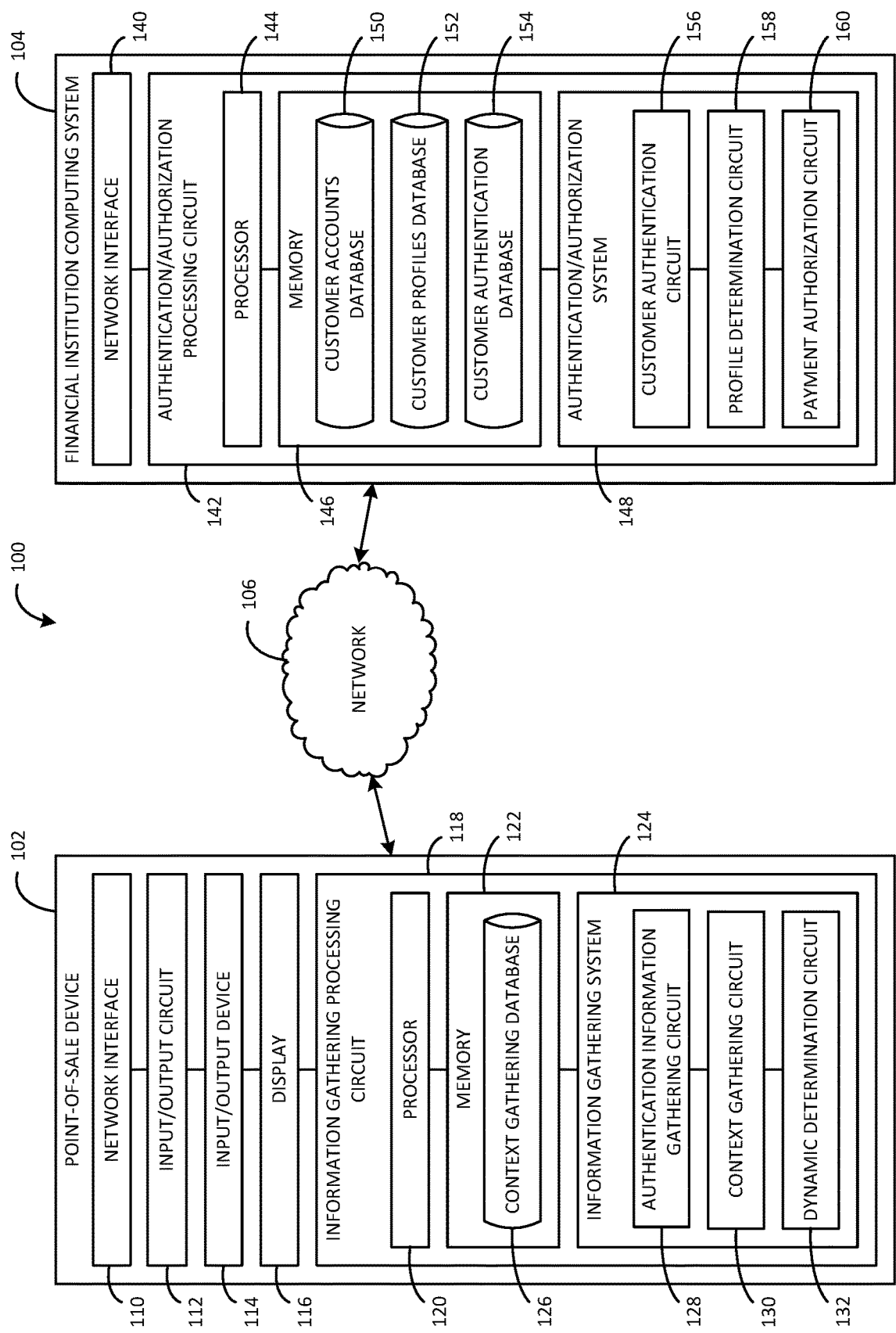
FIG. 1 is an environmental view of a passive authentication system, according to an embodiment.

Referring to the figures generally, various systems, methods, and apparatuses for automatically distinguishing between multiple payment profiles for a given customer through a passive authentication scheme are described herein. As used herein, a "passive authentication scheme" is a system that does not require the user (e.g., a customer) to provide specific credentials, such as a payment card or device, an identification card, a password, a card verification code (CVC), in order to be authorized to complete a transaction. Rather, the customer is authorized through information inherent to the customer, such as a biometric, and/or information that the customer already possesses and that identifies the customer, such as a driver's license number, a phone number, or a birthday. Additionally, a payment profile is a profile that is predetermined by a customer and that contains payment information used by the passive authentication system to pay for transactions initiated by the customer. As such, a payment profile includes at least a profile classification (e.g., personal, business, travel, organization, club, religious group, etc.) and information about a payment account associated with the profile. A payment account may be any account into which the customer can make financial deposits and/or from which the customer can make financial payments. For example, a payment account may be a demand deposit account, debit account, credit account (e.g., personal, business, travel, etc.), gift card account, and so on. A customer may have multiple profiles, where each profile is to be used for certain purchases.

Accordingly, for a given transaction, the passive authentication system described herein is able to passively authenticate a customer and determine, based on the context of the transaction, which of the customer's payment profiles to use for the transaction. More particularly, the passive authentication system described herein is able to authenticate the customer, select the payment profile, and authorize a payment for the transaction from the selected payment profile without a need for the customer to provide a physical payment device. As such, a customer is able to pay for a transaction through the passive authentication system, and have the payment taken from the appropriate payment profile, without having to carry a payment device such as a credit card, a debit card, a smartphone, etc.

An example implementation may be described as follows. A customer who wishes to make a purchase at a merchant's brick-and-mortar location is presented with a point-of-sale (POS) device. Rather than requiring the customer to provide a payment device (e.g. a credit card, a debit card, a mobile wallet, etc.) as in traditional authentication and authorization systems, the POS device gathers information about the customer that allows for passive authentication (i.e., "authentication information"). For example, the POS device may gather a biometric from the customer, such as a voiceprint, a fingerprint, a facial recognition scan, a retinal scan, a gait, etc. As another example, in addition to or instead of the biometric, the POS device may gather other information from the customer that identifies the customer, such as the customer's phone number, birthday, zip code, address, driver's license number, employee number, and so on. Alternatively, another device in the brick-and-mortar location may gather the information about the customer and provide that information to the POS device. For example, a camera may scan the customer at an entry point of the location, and the camera may send the scan of the customer to the POS device. The POS device and/or the separate device also gather information about the context of the transaction (i.e., "context information"), such as the time of day of the purchase, the location of the purchase, goods or services that the customer wishes to purchase, what the customer is wearing, who the customer is with, and so on.

The POS device then sends the authentication information and the context information to the customer's financial institution. In some arrangements, the POS device sends the information directly to the customer's financial institution. In other arrangements, the POS device sends the information indirectly to the customer's financial institution via the merchant's financial institution and/or a card network, which determines the identity of the customer's financial institution from the information gathered by the POS device. Next, the customer's financial institution authenticates the customer based on the authentication information sent by the POS device. The customer's financial institution then determines which preexisting payment profile to use for the transaction based on the context information sent by the POS device. For example, the customer may have set up, with the financial institution, a personal profile with a personal credit card and a business profile with a business credit card. At the time of the transaction, after authenticating the customer, the financial institution uses the context information (e.g., the time of day of the purchase, the location of the purchase, the goods or services the customer wishes to purchase, what the customer is wearing, who the customer is with, etc.) to determine whether to use the customer's personal profile or business profile for the transaction. Once the financial institution selects the payment profile, the customer's financial institution authorizes the transaction for the payment account associated with the selected profile.

The passive authentication system described herein offers several technical advantages over conventional methods of authenticating and authorizing commercial transactions. One problem with existing payment systems is that they require a customer to possess a physical payment device, such as a credit card or mobile device operating a mobile wallet. The need for a physical payment device can be inconvenient to a customer who, for example, forgets to bring a physical payment device to a brick-and-mortar merchant location or loses a physical payment device. In those situations, a customer desiring to make a payment at a brick-and-mortar location is unable to do so, despite the fact that the customer has an active payment account, because the customer lacks a physical payment device. Furthermore, physical payment devices can be stolen and subsequently used by an imposter to make unwanted purchases from the customer's account. By contrast, the instant passive authentication system described herein allows customers to make payments without the need for a payment device. Accordingly, the passive authentication system increases the ease of transaction for customers over traditional authentication systems, as customers do not have to worry about keeping a physical payment device with them. Additionally, the fact that the passive authentication system does not require a physical payment device allows the passive authentication system to be more secure than traditional payment systems. For one, there is no risk that a customer's payment device will be stolen and then used to make unwanted purchases. Moreover, the type of information gathered to authenticate the customer (e.g., the customer's fingerprint, gait, or face) would be difficult for an imposter to replicate. Thus, it would also be difficult for an imposter to pose as the customer and make an unwanted transaction through the passive authentication system.

Another problem with existing payment systems is that they require a customer who wishes to use different accounts to pay for various transactions to manually select the form of payment each time the customer makes a transaction. Furthermore, the customer may have to possess and use a different physical payment device for each of the customer's accounts. Conversely, with the instant passive authentication system described herein, the customer's financial institution automatically determines the payment profile, and thus the payment account, for the transaction based on the context of the transaction. As such, the customer is spared the inconvenience of having to manually select the form of payment each time the customer makes a transaction. This may be especially beneficial for individuals who make purchases throughout the day or throughout the week for multiple payment accounts (e.g., such as individuals who own small businesses, individuals who are coaches, individuals who are leaders of clubs, church groups, professional organizations, and so on). For such individuals, the passive authentication system described herein increases the ease of transaction over traditional authentication and authorization systems (e.g., by providing faster checkout line throughput, by obviating the need for customers to carry multiple payment devices to merchant locations, etc.) because these individuals need only provide the requested authentication information at the POS device, after which the individual's financial institution automatically determines the payment account for the transaction.

Referring now to FIG. 1, an environmental view of a passive authentication system 100 is shown, according to an example embodiment. As shown, the passive authentication system 100 includes a POS device 102 and a financial institution computing system 104 connected by a secure network (e.g., network 106). With the passive authentication system 100, in some arrangements, a merchant associated with the POS device 102 and a financial system associated with the financial institution computing system 104 have a preexisting relationship such that the POS device 102 transmits gathered authentication and context information directly to the computing system 104 (e.g., by the network 106). For example, the POS device 102 may be a smartphone or tablet computer with an application running thereon that is associated with the financial institution of the computing system 104. Alternatively, in other arrangements, the customer initiating a transaction through the POS device 102 instructs the POS device 102 to send the information gathered as part of the transaction to the financial institution computing system 104. For example, the POS device 102 may ask the customer which bank the customer would like to carry out the payment for the transaction, and the customer selects the financial institution associated with the computing system 104.

The POS device 102 is a computing device associated with a merchant. Examples of merchants include retailers, wholesalers, marketplace operators, service providers (e.g., loan service providers, cleaning service providers, transportation providers, etc.), and so on. In operation, the POS device 102 calculates the total amount owed by a customer for a given purchase transaction and processes the customer's payment for the transaction. In various embodiments, the POS device 102 is configured to gather information about the customer and about the context of the transaction and send the gathered information to the financial institution computing system 104. Alternatively, in other embodiments, the POS device 102 may be incorporated into a merchant computing system that performs at least some of the functions described herein as performed by the POS device 102. For example, the merchant computing system may determine which pieces of contextual information the POS device 102 should gather, and the POS device 102 acts according to the merchant computing system's instructions. As another example, the POS device 102 may gather information about the customer and/or the context of the transaction in concert with another device, such as a camera or a scanner, located elsewhere in the merchant's brick-and-mortar location.

As shown in FIG. 1, in various embodiments, the POS device 102 includes a network interface 110, an input/output circuit 112, an input/output device 114, a display 116, and an information gathering processing circuit 118. The network interface 110 includes program logic that facilitates connection of the POS device 102 to the network 106. Accordingly, the network interface 110 supports communication between the POS device 102 and other components of the system 100, such as the financial institution computing system 104, via the network 106.

The input/output circuit 112 is structured to receive and provide communication(s) to the customer initiating a payment via the POS device 102 and/or an employee of the merchant associated with the POS device 102. In this regard, the input/output circuit 112 is structured to exchange data, communications, instructions, etc. with input/output components of the POS device 102. Accordingly, in various embodiments, the input/output circuit 112 includes the input/output device 114. In other embodiments, the input/output circuit 112 includes communication circuitry for facilitating the exchange of data, values, messages, and the like between the input/output device 114 and the components of the POS device 102. In yet other embodiments, the input/output circuit 112 includes machine-readable media for facilitating the exchange of information between the input/output device 114 and the components of the POS device 102. In still other embodiments, the input/output circuit 112 includes any combination of hardware components (e.g., the input/output device 114), communication, circuitry, and machine-readable media.

In certain embodiments, the input/output device 114 includes hardware and associated logics configured to enable the POS device 102 to exchange information with the customer and/or the employee of the merchant. In various embodiments, an input aspect of the input/output device 114 allows a user to provide information to the POS device 102 and may include, for example, a touchscreen, a mouse, a keypad, a camera, a scanner, a fingerprint scanner, an eye scanner, a sensor that detects movement, a microphone, a joystick, a user input device engageable to the POS device 102 via a USB, wirelessly, or any other type of input device that may be used with a computing device. In various embodiments, an output aspect of the input/output device 114 allows the customer and/or the employee of the merchant to receive information from the POS device 102 and may include, for example, a display, a printer, a speaker, illuminating icons, light emitting diodes ("LEDs"), an output device engageable to the POS device 102 via a USB, wirelessly, or any other type of output device that may be used with a computing device. In certain embodiments, as described herein, the input/output device 114 is configured to gather information about the customer and about the context of a payment transaction in order to carry out a payment from the customer to the merchant.

In various embodiments, the display 116 may be a screen, a touchscreen, a monitor, etc. The POS device 102 may use the display 116 to communicate information to the customer and/or the employee of the merchant (e.g., by displaying the information to the customer and/or the employee on the display 116). Additionally, the POS device 102 may use the display 116 to receive communications from the customer and/or the employee of the merchant (e.g., through a keyboard provided on a touchscreen of the display 116). In some embodiments, the display 116 may be incorporated as part of the input/output device 114, while in other embodiments, the display 116 may be separate from the input/output device 114.

The information gathering processing circuit 118 is structured to facilitate the gathering of authentication information about the customer and information about the context of a given payment transaction. The information gathering processing circuit 118 is further structured to send the gathered information to the financial institution computing system 104 so that the customer may be authenticated and the payment to the merchant may be authorized, as described in further detail below. In some embodiments, the information gathering processing circuit 118 implements a program, such as an application for a smartphone or tablet computer, to carry out the functions described herein. In other embodiments, the information gathering processing circuit 118 may be specific to the POS device 102, which is, in turn, specifically created to function as part of the passive authentication system 100.

As shown in FIG. 1, the information gathering processing circuit 118 includes a processor 120, a memory 122, and an information gathering system 124. As shown in FIG. 1, the POS device 102 further includes a context gathering database 126.

The context gathering database 126 retrievably stores an inventory of potential context elements that the POS device 102, or a device associated with the POS device 102, may gather about the context of a given transaction. As used herein, a "context element" is a piece of information that describes the context of the transaction. The inventory of potential context elements may include information about the customer, information about the customer's environment at the time of the transaction, and/or information about the customer's intended purchase. For example, the context gathering database 126 may include potential context elements relating to the merchant operating the POS device 102, what the customer is wearing (e.g., a type of clothes the customer is wearing), an individual proximate to the customer during the transaction, the location of the transaction, at least one item the customer is purchasing through the transaction, a total cost of the transaction, a time of the transaction, a day-of-week of the transaction, and so on. Accordingly, the POS device 102 uses the context gathering database 126 to determine which context elements the POS device 102 can and should gather about the context of the requested transaction, as described in further detail below.

The information gathering system 124 is configured to receive a request to initiate a payment transaction and, in response, gather authentication information about the customer and information about the context of the transaction. The information gathering system 124 is further configured to send the gathered authentication and context information to the financial institution computing system 104 (e.g., by the network 106).

As shown in FIG. 1, the information gathering system 124 includes an authentication information gathering circuit 128, a context gathering circuit 130, and a dynamic determination circuit 132. The authentication information gathering circuit 128 is structured to gather information about the customer that the financial institution computing system 104 can use to authenticate a customer initiating a transaction. The authentication information may be a biometric of a customer, such as a fingerprint, a handprint, a facial scan, an eye scan, a gait, a voiceprint, and so on. Alternatively, the authentication information may be an identifying number associated with the customer, such as a phone number, a birthday, a zip code, an address, a driver's license number, an employee number, and so on. In certain embodiments, the authentication information gathering circuit 128 may gather more than one piece of authentication information associated with the customer. For example, the authentication information gathering circuit 128 may gather a fingerprint and a phone number of the customer.

In some embodiments, the authentication information gathering circuit 128 may gather the authentication information through the input/output circuit 112 and the input/output device 114 of the POS device 102. For example, the input/output device 114 may include a fingerprint scanner from which the authentication information gathering circuit 128 receives a fingerprint. As another example, the input/output device 114 may include a camera, and the authentication information gathering circuit 128 runs facial recognition software on images gathered by the camera (e.g., software that identifies facial features based on landmarks extracted from the images of the customer's face). As a third example, the input/output device 114 may include a keyboard from which the authentication information gathering circuit 128 receives a phone number, birthday, zip code, etc. from the customer. In other embodiments, the authentication information gathering circuit 128 may gather the authentication information through a separate device, such as a scanner located at an entry point to the merchant location, cameras positioned throughout the merchant location, and so on. As an example, cameras positioned throughout the merchant location may record the customer as the customer walks through the merchant location. The authentication information gathering circuit 128 then uses the video of the customer to identify a gait of the customer (e.g., by analyzing the video to determine trajectories of the customer's joints and angles as the customer walks and thereby develop a mathematical model describing how the customer walks). Regardless, once the information is gathered, the authentication information gathering circuit 128 is structured to send the gathered authentication information to the financial institution computing system 104 (e.g., by the network 106).

In one embodiment, the authentication information gathering circuit 128 requests or gathers specific authentication information from the customer. For example, the authentication information gathering circuit 128 may request (e.g., via the display 116) that the customer provide a handprint and the customer's birthday to the POS device 102. As another example, the authentication information gathering circuit 128 may automatically gather certain authentication information about the customer, such as the customer's gait or a scan of the customer, before or after the customer initiates the transaction. In another embodiment, the authentication information gathering circuit 128 allows the customer to select (e.g., via the display 116) the type of authentication information that the customer will provide. For example, the authentication information gathering circuit 128 may display to the customer a list of authentication information options the customer may choose provide to the POS device 102, such a fingerprint, a handprint, a facial scan, a driver's license number, and a phone number, and the customer selects two to provide to the POS device 102.

The context gathering circuit 130 is structured to gather information about the context of a transaction. In various embodiments, the overall context information for a transaction is comprised of discrete context elements that are identified by the context gathering circuit 130. In gathering the context information, the context gathering circuit is structured to consult the inventory of potential context elements stored in the context gathering database 126. Accordingly, as shown in FIG. 1, the information gathering system 124 is communicably and operatively coupled to the memory 122 such that the context gathering circuit 130 is able to examine information stored in the context gathering database 126.

In one embodiment, the context gathering circuit 130 gathers information about the customer, such as what the customer is wearing (e.g., the type of clothes the customer is wearing, such as whether the customer is wearing casual clothes, business clothes, a uniform, etc.), who the customer is with (e.g., one or more individuals proximate to the customer during the transaction, such as children, business colleagues, etc.), what the customer is carrying (e.g., an accessory the customer is carrying, such as luggage, a briefcase, etc.), and so on. For example, the context gathering circuit 130 may receive, from a camera, image data of the customer initiating the transaction at the POS device 102. The context gathering circuit 130 may then use content-based image retrieval to determine the context elements present in the image data. As an illustration, the context gathering circuit 130 may extract the colors, shapes, textures, gradients, or any other visual information from the image data and use an algorithm to compute values representing each group of extracted visual information (e.g., use a hash function to compute a series of hashes for the image). The context gathering circuit 130 may compare the computed values to indexed values for the inventory of images in the context gathering database 126. The context gathering circuit 130 may determine that the inventory images with the most matches to the computed values are the context elements for the transaction. As another example, the context gathering circuit 130 may receive image data of the customer and individuals proximate to the customer as the customer is initiating the transaction at the POS device 102. The context gathering circuit 130 may then use a facial recognition algorithm to identify the faces in the image data and extract facial landmarks for each of the faces to determine, as an illustration, whether the customer is accompanied by children, adults, men, women, etc.

In a second embodiment, alternatively or additionally, the context gathering circuit 130 gathers information about the location of the transaction, such as the identity of the merchant location (e.g., a hardware store, a wholesale club, a grocery store, etc.), where geographically the transaction is taking place (e.g., whether the transaction is taking place at a location near the customer's home, near the customer's workplace, near the headquarters of an organization the customer is a part of, in an airport, etc.), and so on. In one example, the context gathering circuit 130 may receive information from an employee of a merchant the POS device 102 is associated with when the POS device 102 is set up at the merchant location. The set up information may include information about the merchant and information about the geographic location of the POS device 102, which the context gathering circuit may store in the context gathering database 126. In another example, the POS device 102 may include a global positioning system ("GPS") device through which the context gathering circuit 130 may determine the geographic location of the POS device 102.

In a third embodiment, alternatively or additionally, the context gathering circuit 130 gathers information about the transaction itself, such as what the customer is purchasing (e.g., home supplies, office supplies, resalable items, etc.), how much the customer is purchasing (e.g., individual items, items in bulk, etc.), and so on. As an example, the input/output device 114 may include a barcode scanner, and the context gathering circuit 130 may determine from universal product codes ("UPCs") scanned with the barcode scanner the items that the customer intends to purchase. The context gathering circuit 130 may further determine the total cost of the intended purchase, the costs of various subcategories of the intended purchase, and so on.

In a fourth embodiment, alternatively or additionally, the context gathering circuit 130 gathers information about the time of the transaction, such as the time of day of the transaction (e.g., during the workday, after the workday, on the weekend, etc.), the time of week of the transaction (e.g., during a weekday, during a weekend, etc.), the time of year of the transaction (e.g., whether the transaction is taking place on or near a holiday, whether the transaction is taking place at a time of year the customer's business places most of its orders, etc.), and so on. For example, the context gathering circuit 130 may include an internal clock that records the timestamp of the transaction and compares the timestamp to a calendar.

In a fifth embodiment, alternatively or additionally, the context gathering circuit 130 gathers information about the merchant operating the POS device, such as products commonly purchased from the merchant, spending habits at the merchant (e.g., the customer's historical spending habits at the merchant, the spending habits of a variety of customers at the merchant, etc.), and so on. For example, the context gathering circuit 130 may retrieve a record of the customer's transactions with the merchant from a database (e.g., recorded in association with the customer based on a customer account, identifying information for the customer, etc.).

Furthermore, in various embodiments, the context gathering circuit 130 may identify additional context elements by using the context gathering database 126 to determine what categories identified context elements fall into. In one embodiment, the context gathering database 126 may list the style of the customer's clothes as a potential context element, with the possible options being casual clothes, business clothes, and non-business uniforms. The context gathering circuit 130 may determine that the customer is wearing a suit and carrying a briefcase (e.g., using the image identification process described above) and use a classification system in the context gathering database 126 to further determine that a suit and briefcase align with the business clothes context element. In another embodiment, the context gathering database 126 may list the types of products the customer intends to purchase as a potential context element, and the context gathering circuit 130 may determine that, based on the fact that the customer is purchasing printer paper, labels, and envelopes, the products being purchased fall under a home office supplies context element.

In one embodiment, the context gathering circuit 130 may gather at least some of the context information through the input/output circuit 112 and the input/output device 114 of the POS device 102. As an example, the input/output device 114 may include a camera by which the context gathering circuit 130 may take a scan of the environment surrounding the customer at the time the customer initiates a transaction by the POS device 102. In another embodiment, the context gathering circuit 130 may gather at least some of the context information through internal processes of the POS device 102. For example, the POS device 102 may include an internal clock that records a timestamp of the transaction. In yet another embodiment, the context gathering circuit 130 may gather at least some of this information through a separate device, such as a scanner located at an entry point to the merchant location, cameras positioned throughout the merchant location, and so on.

Once the context gathering circuit 130 has finished gathering context elements for the context information, the context gathering circuit 130 is structured to send the gathered context information comprising all of the identified context elements to the financial institution computing system 104 (e.g., via the network 106). In some embodiments, the context gathering circuit 130 may send the gathered context information to the financial institution computing system 104 at the same time the authentication information gathering circuit 128 sends the authentication information to the computing system 104. In other embodiments, the context gathering circuit 130 may wait to receive an indication from the computing system 104 that the customer has been authenticated before gathering and/or sending the context information.

In some embodiments, the context elements gathered by the context gathering circuit 130 are the same for every transaction. In other embodiments, as shown in FIG. 1, the POS device 102 further includes the dynamic determination circuit 132. The dynamic determination circuit 132 is structured to dynamically determine which context elements the context gathering circuit 130 should gather for a given transaction. Accordingly, in various embodiments, the dynamic determination circuit 132 determines which context elements to gather for a particular transaction based on the inventory of potential context elements stored in the context gathering database 126.

In some embodiments, the dynamic determination circuit 132 may determine, based on a preliminary assessment of the transaction context, which elements the context gathering circuit should gather. For example, a customer wearing a suit and accompanied by other people wearing suits may initiate a transaction at the POS device 102. The dynamic determination circuit 132 may preliminarily assess (e.g., use a content-based image retrieval method that only looks at shapes) the customer's context and compare the preliminary assessment of the customer's context to the inventory of potential context elements stored in the context gathering database 126. Accordingly, the dynamic determination circuit 132 may determine that the context gathering circuit 130 should gather context elements related to the customer's clothes and the people accompanying the customer. As another example, a customer may initiate a transaction at the POS device 102 on a weekend. The dynamic determination circuit 132 may determine, based on the timestamp of the transaction, that it is unlikely that the customer is making a business purchase. As such, the dynamic determination circuit 132 may instruct the context gathering circuit 130, in gathering the context information, to ignore potential context elements stored in the context gathering database 126 that relate to business purchases. In this way, the dynamic determination circuit 132 may limit the amount of information that the context gathering circuit 130 gathers for a given transaction. This may, for example, ensure that the context gathering circuit 130 does not gather extraneous information for the financial institution computing system 104 and thereby speed up the payment processing for the transaction.

Alternatively, instead of determining what context information the context gathering circuit 130 should gather, in other embodiments, the dynamic determination circuit 132 examines the various context elements broadly gathered by the context gathering circuit 130 and determines which elements should be passed on to the financial institution computing system 104. In doing so, the dynamic determination circuit 132 may again consult the inventory of potential context elements stored in the context gathering database 126. As an example, the dynamic determination circuit 132 may examine the context elements gathered by the context gathering circuit 130 for a given transaction and determine which elements will likely help the financial institution computing system 104 evaluate the context of the transaction. For instance, the context gathering circuit 130 may have been unable to determine what style of clothing the customer is wearing and therefore categorized the customer's clothes in an "other" category. Because that is unlikely to help the computing system 104 evaluate the transaction's context, the dynamic determination circuit 132 may therefore remove the clothes style element from the context information to be transmitted to the computing system 104.

The financial institution computing system 104 is associated with or operated by a financial institution (e.g., a bank, a credit card issuer, etc.) or any other entity interested in offering payment services. In practice, the financial institution computing system 104 includes server computer systems, for example, comprising one or more networked computer servers together having at least a processor and non-transitory machine readable media with instructions stored thereon.

As shown in FIG. 1, the financial institution computing system 104 includes a network interface 140 and an authentication/authorization processing circuit 142. The network interface 140 includes program logic that facilitates connection of the financial institution computing system 104 to the network 106. Accordingly, the network interface 140 supports communication between the financial institution computing system 104 and other components of the system 100, such as the POS device 102, via the network 106.

As shown, the authentication/authorization processing circuit 142 includes a processor 144, a memory 146, and an authentication/authorization system 148. The financial institution computing system 104 further includes a customer accounts database 150, a customer profiles database 152, and a customer authentication database 154.

The customer accounts database 150 is configured to retrievably store information relating to various accounts (e.g., demand deposit, credit, debit, etc.) held by customers of the financial institution computing system 104. The stored account information may include, for example, account numbers, account types, account balances, personal identification numbers (PINs), biographical information for each customer, contact information for each customer, and so on.

The customer profiles database 152 is configured to retrievably store information relating to profiles of the customers of the financial institution computing system 104. In various embodiments, a given customer profile includes at least a classification of the profile and a payment type associated with the profile. For example, a customer may make a cash rewards profile and a travel profile through the computing system 104. The cash rewards profile includes the account number of a personal cash rewards credit card held by the customer, and the travel profile includes the account number of a personal credit card held by the customer that the customer prefers for traveling (e.g., because the credit card has no foreign transaction fees). In some embodiments, a given customer profile further includes rules set up by the customer that dictate when the financial institution computing system 104 should use the payment profile for a transaction. Each rule may describe a context element that is associated with the rule's payment profile. Referring back to the previous example, the customer may include rules for the cash rewards profile dictating that the computing system 104 use the cash rewards credit card when the requested transaction is taking place on a weekend or when the customer is buying groceries. The customer may further include rules for the travel profile dictating that the computing system 104 should use the travel credit card when the requested transaction is taking place in an airport or a foreign country.

The customer authentication database 154 is configured to retrievably store information that allows the financial institution computing system 104 to authenticate customer. In various embodiments, the customer authentication database 154 stores one or more "authentication templates" for each customer, where each authentication template includes reference information provided by the customer that the computing system 104 can compare to received authentication information in order to determine whether the received authentication information matches the template. In one embodiment, the customer authentication database 154 stores one or more biometric reference templates for a given customer. A biometric reference template may be of a fingerprint, a handprint, a facial scan, an eye scan, a gait, a voiceprint, etc. In another embodiment, the customer authentication database 154 stores one or more identifying numbers associated with the customer, such as the customer's phone number, birthday, zip code, address, driver's license number, employee number, and so on. In yet another embodiment, the customer authentication database 154 stores multiple authentication templates for the same customer (e.g., a fingerprint, a voiceprint, and a driver's license number).

The authentication/authorization system 148 is configured to, for a given transaction, authenticate the customer, determine which of the customer's profiles to use for the transaction, and authorize a payment for the transaction using the payment account associated with the selected profile. As shown in FIG. 1, the authentication/authorization system 148 includes a customer authentication circuit 156, a profile determination circuit 158, and a payment authorization circuit 160, which carry out these functions.

The customer authentication circuit 156 is structured to receive authentication information transmitted by the authentication information gathering circuit 128 of the POS device 102. The customer authentication circuit 156 is further structured to authenticate the customer using the received authentication information. As shown in FIG. 1, the authentication/authorization system 148 is communicably and operatively coupled to the memory 146. Accordingly, when authenticating the customer, the customer authentication circuit 156 examines the one or more authentication templates for the customer stored in the customer authentication database 154 to determine whether the authentication information received from the POS device 102 matches any of the authentication templates stored for the customer. If the authentication information matches a template, then the customer authentication circuit 156 determines that the customer is authentic and sends a message to the POS device 102 indicating that the customer has been authenticated. If the authentication information does not match a template, then the customer authentication circuit 156 determines that the customer is not authentic. The customer authentication circuit 156 may then deny the transaction, send an error message to the POS device 102, ask the POS device 102 to have the customer provide different authentication information, or so on.

In some embodiments, the customer authentication circuit 156 requires more than one piece of authentication information in order to authenticate the customer. For example, the customer authentication circuit 156 may receive a fingerprint for the customer from the POS device 102, which the customer authentication circuit 156 authenticates with a fingerprint reference template for the customer stored in the customer authentication database 154. After authenticating the fingerprint, the customer authentication circuit 156 then requests, via the POS device 102, an additional piece of authentication information from the customer. Subsequently, the customer authentication circuit 156 may receive, by the POS device 102, a driver's license number for the customer. The customer authentication circuit 156 authenticates the received driver's license number with the driver's license number for the customer stored in the customer authentication database 154 and, after doing so, sends a notification to the POS device 102 indicating that the customer has been authenticated. Alternatively, in other embodiments, the customer authentication circuit 156 may require only one piece of certain types of authentication information but require more than one piece of other types of authentication information. For example, the customer authentication circuit 156 may authenticate the customer with a single biometric (e.g., authenticate the customer based on the customer providing just a fingerprint to the POS device 102) but require the customer to provide two pieces of non-biometric authentication information for authentication purposes (e.g., authenticate the customer based on the customer providing a driver's license number and a phone number, but not based on the customer providing just a driver's license number).

The profile determination circuit 158 is structured to receive the context information sent by the context gathering circuit 130 of the POS device 102. The profile determination circuit 158 is further structured to determine, based on the received context information, which profile to use for the customer for the requested transaction. In one embodiment, the profile determination circuit 158 determines which profile to use after examining the classifications for the customer's profiles stored in the customer profiles database 152. The profile determination circuit 158 compares the received context elements to the classifications and selects the profile whose classification most closely matches the received context elements (e.g., the profile whose classification matches the most context elements). For example, a customer may have a personal profile, a business profile, and a club sports profile. The received context information may include the following elements: (a) that the customer is wearing a sports uniform, (b) that the customer is requesting the transaction at 8:00 PM on a Thursday, and (c) that the customer is within five miles of where the customer plays the club sport. Based on the fact that the context elements suggest that the customer is making the transaction in a club sports setting, the profile determination circuit 158 selects the club sports profile for the customer.

In another embodiment, alternatively or additionally, the profile determination circuit 158 determines which profile to use based on rules preset by the customer for each profile. The profile determination circuit 158 compares the received context elements to the rules for each profile and selects the profile whose rules most closely match the context elements (e.g., the profile with the most rules or highest percentage of rules that match a context element). For example, the customer may set rules for a personal profile dictating that the computing system 104 should use the personal profile when the requested transaction is taking place on a weekend or holiday or when the customer is buying groceries. The customer may further set rules for a business profile dictating that the computing system 104 should use the business profile when the requested transaction is taking place within five miles of the customer's workplace or when the customer is wearing a suit. Later, the profile determination circuit 158 may receive context information for the customer, which includes the following elements: (a) that the customer is wearing a suit, (b) that the customer is within the customer's work compound, and (c) that the customer is making the transaction at 1:00 PM on a Tuesday. Because the (a) and (b) elements match the rules for the business profile, and no elements match the rules for the personal profile, the profile determination circuit 158 selects the business profile for the transaction.

If the profile determination circuit 158 is unable to determine which payment profile to use (e.g., because the same number of context elements match two profiles), then the profile determination circuit 158 may determine that the transaction payment should be made from a default payment account, such as a payment account selected by the customer as the default payment account, the customer's most commonly used credit card account number, and so on. The customer may then be able to later change the payment account. Alternatively, the profile determination circuit 158 may determine that the transaction payment should be made from a slush fund or holding account.

The payment authorization circuit 160 is structured to authorize the transaction based on the profile selected by the profile determination circuit 158. Accordingly, the payment authorization circuit 160 is structured to determine which payment account is indicated in the selected customer profile and find the payment information for that payment account in the customer accounts database 150. The payment authorization circuit 160 then determines whether to authorize a payment for the requested transaction using the indicated payment account. For example, the payment authorization circuit 160 may determine, based on the information stored in the customer accounts database 150, the amount of credit remaining for the customer for the given account and authorize the payment only if the amount of credit is greater than the payment amount for the transaction. As another example, the payment authorization circuit 160 may determine, based on the information stored in the customer accounts database 150, the amount of money remaining in a bank account held by the customer and only authorize the payment if the amount of money is greater than the payment amount for the transaction. In some embodiments, if the payment authorization circuit 160 cannot authorize a payment using the selected customer profile, then the payment authorization circuit 160 denies the transaction. In other embodiments, the payment authorization circuit 160 instead determines whether to authorize a payment using a different profile for the customer (e.g., the profile that matches the second-most context elements, as determined by the profile determination circuit 158).

In some embodiments, the payment authorization circuit 160 authorizes the payment at the same time the customer authentication circuit 156 authenticates the customer. For example, the POS device 102 may send the authentication and context information to the computing system 104 at the same time. The customer authentication circuit 156 then authenticates the customer, the profile determination circuit 158 selects the payment profile directly afterwards, and the payment authorization circuit 160 immediately authorizes payment through the selected payment profile. In other embodiments, the payment authorization circuit 160 authorizes the payment at some point after the customer authentication circuit 156 authenticates the customer. For example, the POS device 102 may send the authentication information to the computing system 104. As described above, the customer authentication circuit 156 then authenticates the customer using the received authentication information and sends a notification to the POS device 102 indicating that the customer is authenticated. Subsequently, the POS device 102 sends the context information to the computing system 104, after which the profile determination circuit 158 selects the payment profile and the payment authorization circuit 160 authorizes the payment.

Once the payment authorization circuit 160 authorizes the transaction, the payment authorization circuit 160 transmits a notification to the POS device 102 indicating that the payment is authorized. In some arrangements, the payment authorization circuit 160 may subsequently transmit payment information to the POS device 102. In other arrangements, the POS device 102 may transmit to the financial institution computing system 104 information regarding the merchant's financial institution (e.g., either at the time the POS device 102 transmits the authentication and/or context information, or in response to the computing system 104 transmitting the authorization notification), and the payment authorization circuit 160 may instead transmit payment information directly to the merchant's financial institution. Once a payment is made to the merchant's financial institution, the payment authorization circuit 160 is structured to further update information about the customer's accounts in the customer accounts database 150.

Additionally, the payment authorization circuit 160 is structured to modify the payment account used for the transaction upon a request from the customer. The customer may request that the payment account be modified because, for example, the profile determination circuit 158 selected the incorrect payment profile for the transaction or was unable to determine which payment profile to use for the transaction. Referring back to the previous example, the profile determination circuit 158 selects the customer's business profile for the transaction based on the fact that the customer is wearing a suit and the customer is requesting the transaction within the customer's work compound, which match the customer's preset rules for the business profile. However, the transaction is actually for a lunch the customer had with a friend and is accordingly not work-related. Thus, the payment authorization circuit 160 may later receive a request from the customer that the payment account for the transaction be switched from the customer's business credit card account to the customer's personal credit card account. The payment authorization circuit 160 then switches the payment account accordingly.

Figure 2:
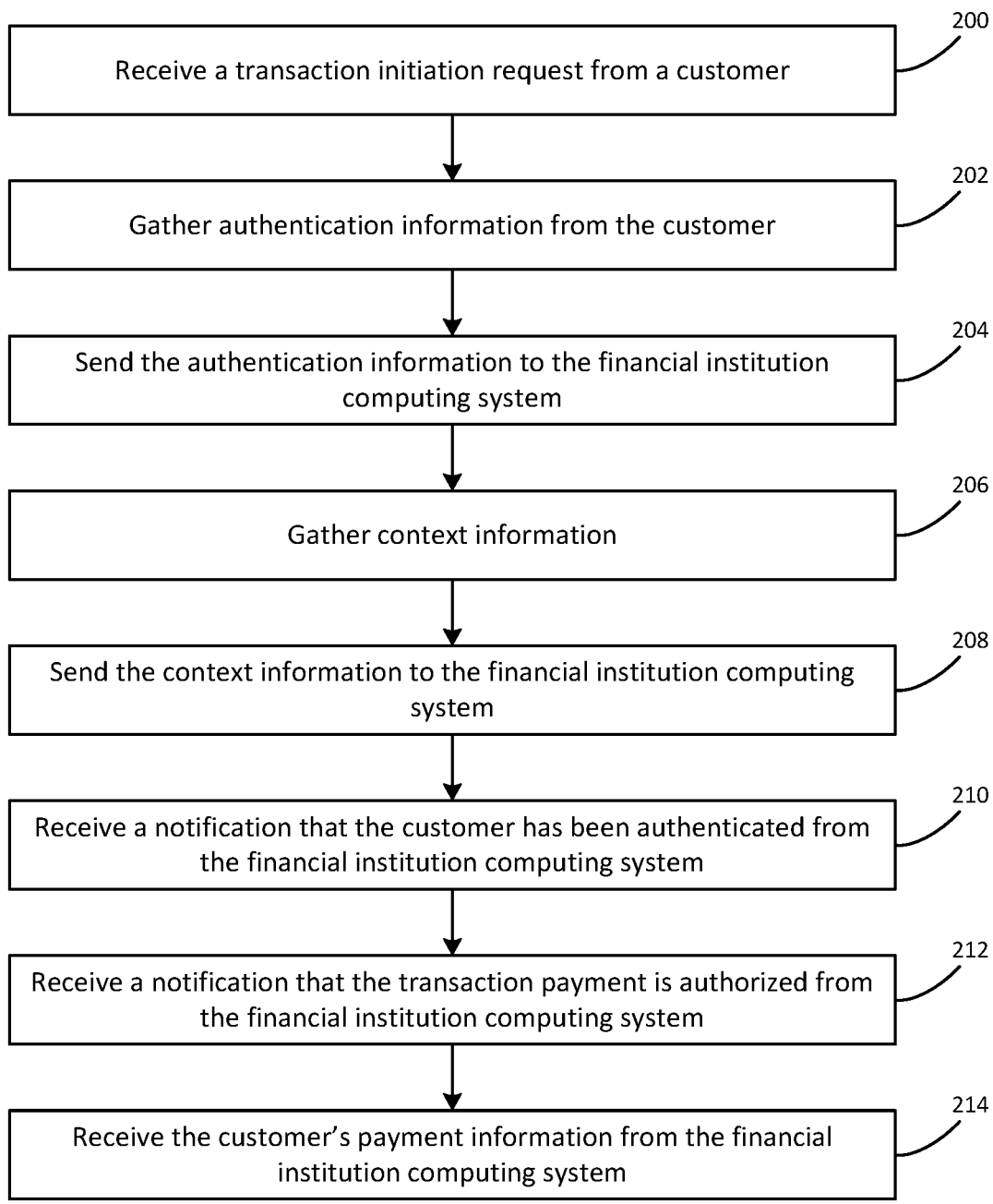
FIG. 2 is a flow diagram illustrating a method of passively authenticating a customer and authorizing a payment by the system of FIG. 1, according to an embodiment.
Figure 3:
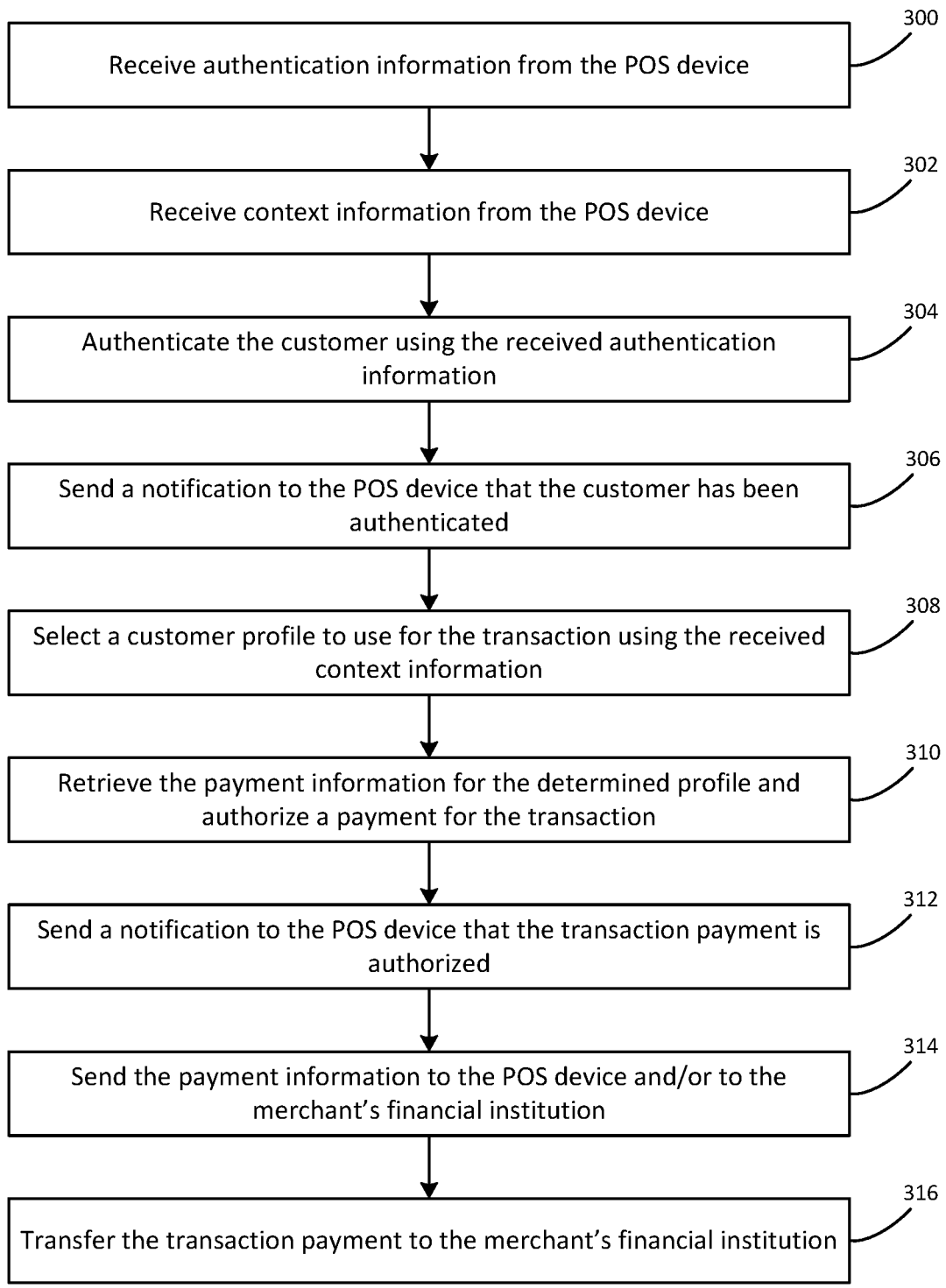
FIG. 3 is a flow diagram illustrating a method of passively authenticating a customer and authorizing a payment by the system of FIG. 1, according to an embodiment.

Referring now to FIGS. 2 and 3, flow diagrams illustrating a method of passively authenticating a customer and authorizing a payment by the passive authentication system 100 are shown, according to an example embodiment. Referring first to FIG. 2, the method of passively authenticating a customer and authorizing a payment is shown from the perspective of the POS device 102.

At step 200, the POS device 102 receives a transaction initiation request from a customer. For example, the customer scans items the customer wishes to purchase through the input/output device 114 (e.g., a barcode scanner) of the POS device 102 and selects an option through the POS device 102 (e.g., by the display 116) to initiate a payment for the desired purchase.

At step 202, the POS device 102 gathers authentication information from the customer. As discussed above, the authentication information may be a biometric of the customer (e.g., a fingerprint, a handprint, a facial scan, an eye scan, a gait, a voiceprint, etc.) or an identifying number associated with the customer (e.g., the customer's phone number, birthday, zip code, address, driver's license number, employee number, etc.). The POS device 102 may gather certain authentication information about or from the customer (e.g., automatically scan the customer when the customer enters the merchant location or initiates a transaction through the POS device 102), or the POS device 102 may allow the customer to select what authentication information the customer will provide to the POS device 102. Subsequently, at step 204, the POS device 102 sends the gathered authentication information to the financial institution computing system 104.

At step 206, the POS device 102 gathers context information for the transaction. For example, the POS device 102 may gather information about the merchant operating the POS device 102, what the customer is wearing (e.g., the type of clothes the customer is wearing), an individual proximate to the customer during the transaction, what the customer is holding (e.g., an accessory the customer is carrying), a location of the transaction, at least one item the customer is purchasing, a total cost of the transaction, the time of the transaction, the day-of-week of the transaction, and so on. In some embodiments, as discussed above with respect to the dynamic determination circuit 132, the POS device 102 may dynamically determine what context information to gather. At step 208, after gathering the context information, the POS device 102 sends the context information to the financial institution computing system 104.

At step 210, the POS device 102 receives a notification that the customer has been authenticated from the financial institution computing system 104. In some embodiments, the POS device 102 may gather and send the context information (i.e., perform steps 206 and 208) at the same time as or shortly after the POS device 102 gathers and sends the authentication information (i.e., performs steps 202 and 204). In other embodiments, the POS device 102 may gather and send the context information only after receiving the notification from the financial institution computing system 104 that the customer has been authenticated (i.e., perform steps 206 and 208 after step 210). Additionally, in various embodiments, upon receiving the authentication notification, the POS device 102 displays the notification (e.g., on the display 116) to the customer and/or to an employee to verify that the customer has been successfully authenticated.

At step 212, the POS device 102 receives a notification that the transaction payment is authorized from the financial institution computing system 104. In various embodiments, the POS device 102 then displays the notification (e.g., on the display 116) to the customer and/or to the employee to verify that the transaction has been authorized and approved.

Finally, at step 214, the POS device 102 receives the customer's payment information from the financial institution computing system 104. Subsequently, the POS device 102 processes the customer's payment for the transaction. For example, the POS device 102 sends the payment information to the financial institution of the merchant associated with the POS device 102, which coordinates a payment from the financial institution associated with the computing system 104 to the merchant's financial institution. Alternatively, instead of step 214, the POS device 102 sends to the financial institution computing system 104 information regarding the merchant's financial institution and information regarding an account held by the merchant at the merchant's financial institution, such that the computing system 104 is able to exchange payment information directly with the merchant's financial institution.

Referring now to FIG. 3, the method of passively authenticating a customer and authorizing a payment is shown from the perspective of the financial institution computing system 104. At step 300, the financial institution computing system 104 receives authentication information for a customer from the POS device 102. At step 304, the financial institution computing system 104 receives, from the POS device 102, context information for the transaction between the customer and the merchant associated with the POS device 102.

At step 304, the financial institution computing system 104 authenticates the customer using the received authentication information. In various embodiments, the computing system 104 authenticates the customer by determining whether the received authentication information matches one or more authentication templates stored in the customer authentication database 154. In some embodiments, the computing system 104 may authenticate the customer with a single piece of authentication information, while in other embodiments, the computing system 104 may require more than one piece of authentication information in order to authenticate the customer. Assuming the customer is successfully authenticated, at step 306, the financial institution computing system 104 sends a notification to the POS device 102 indicating that the customer has been authenticated. Alternatively, if the authentication is not successful, then the financial institution computing system 104 may send a notification to the POS device 102 indicating that the customer has not been successfully authenticated and informing the POS device 102 that the transaction is denied or requesting new authentication information from the POS device 102.

At step 308, the financial institution computing system 104 selects the customer profile to use for the transaction using the received context information. In making this selection, the computing system 104 examines the profiles stored for the customer in the customer profiles database 152. In some embodiments, the computing system 104 may determine which profile to use based on which profile classification (e.g., a personal profile, a business profile, a club profile, an organization profile, a cash rewards profile, a travel profile, etc.) best matches the received context information. In other embodiments, the computing system 104 may determine which profile to use based on which profile rules, predetermined by the customer, best match the context information.

At step 310, the financial institution computing system 104 retrieves the payment account information for the selected profile from step 308 (e.g., from the customer accounts database 150). Further, at step 310, the computing system 104 authorizes a payment for the transaction. For example, if the payment account associated with the selected profile is a credit card account, then the computing system 104 authenticates the payment by verifying that the customer has enough credit left to cover the amount of the transaction. Subsequently, at step 312, the computing system 104 sends a notification to the POS device 102 indicating that the transaction payment is authorized.

At step 314, the financial institution computing system 104 sends the payment information to the POS device 102 and/or to the merchant's financial institution. In some embodiments, the computing system sends the payment information to the POS device 102, and the POS device 102 completes the transaction. In other embodiments, the computing system 104 receives information about the merchant's financial institution from the POS device 102, and the computing system 104 instead transmits the payment information directly to the merchant's financial institution.

Finally, at step 316, the financial institution computing system 104 transfers the transaction payment to the merchant's financial institution. In various embodiments, the computing system 104 then updates information about the customer's account from which the payment was taken in the customer accounts database 150.

Figure 4:
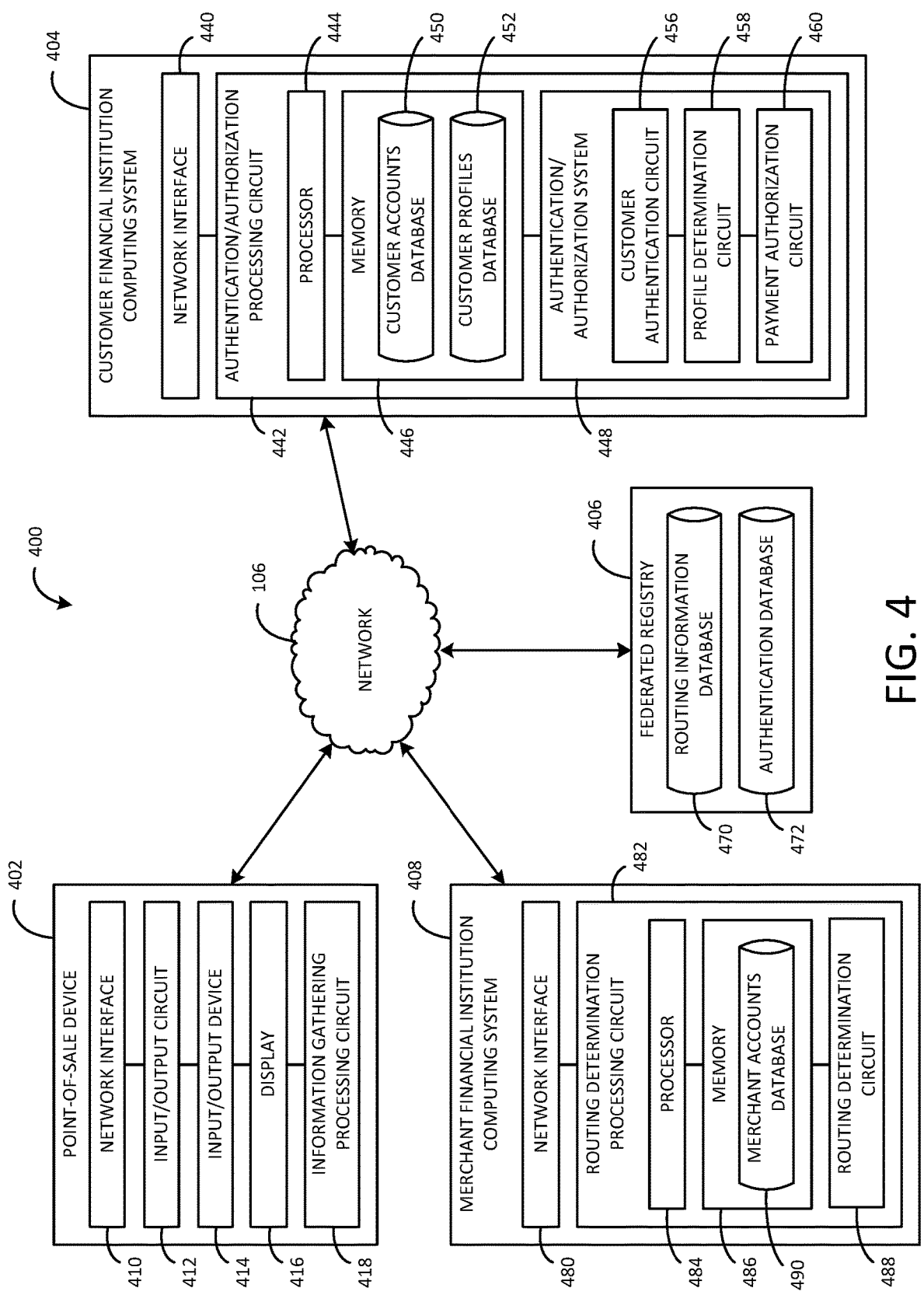
FIG. 4 is an environmental view of a passive authentication system, according to a second embodiment.

Referring now to FIG. 4, an environmental view of a passive authentication system 400 is shown, according to another example embodiment. Similar to the passive authentication system 100, the passive authentication system 400 includes a POS device 402 and a customer financial institution computing system 404. Additionally, the passive authentication system 400 includes a federated registry 406 and a merchant financial institution computing system 408. As shown, the POS device 402, customer financial institution computing system 404, federated registry 406, and merchant financial institution computing system 408 are connected by a secure network (e.g., network 106). Unlike the passive authentication system 100, there is no preexisting relationship between the merchant associated with the POS device 402 and the customer's financial institution in the passive authentication system 400. Additionally, the POS device 402 is unable to otherwise determine (e.g., based on customer input) that the information gathered and received as part of a transaction should be sent to the customer financial institution computing system 404. Accordingly, in the passive authentication system 400, the merchant financial institution computing system 408 and/or a card network (not shown) act as intermediaries in the passive authentication system 400 and determine where to route the information gathered and received by the POS device 402.

The federated registry 406 is configured to retrievably store information that can be used to determine where to route the authentication and context information gathered by the POS device 402. Additionally, the federated registry 406 may be further configured to retrievably store information that can be used to authenticate a customer. In various embodiments, customers register certain information with the federated registry 406 such that the federated registry 406 is able to provide information regarding routing and/or authentication to inquiring financial institutions (e.g., the merchant financial institution computing system 408 or a card network). Alternatively, the federated registry 406 gathers information used for routing and/or authentication from other sources, such as financial institutions (e.g., the customer financial institution computing system 404). In practice, the federated registry 406 includes server computer systems, for example, comprising one or more networked computer servers together having at least a processor and non-transitory machine readable media with instructions stored thereon. Additionally, in some arrangements, the federated registry 406 is an independent computing system, as shown in FIG. 4. However, in other arrangements, the federated registry 406 may be part of a financial institution, such as the customer financial institution computing system 404.

As shown, the federated registry 406 includes a routing information database 470 and an authentication database 472. The routing information database 470 is structured to retrievably store information that may be used by inquiring financial institutions to determine where to route the information gathered and received by the POS device 402 as part of a customer transaction. In one embodiment, the routing information database 470 may store the identities of various customers and the financial institution(s) each customer is associated with. As such, provided that an inquiring financial institution has the identity of the customer, the inquiring financial institution may determine the identity of the customer's financial institution(s) from the routing information database 470. In another embodiment, the routing information database 470 may store customer tokens, where each customer token is stored in association with a financial institution. Customer tokens may be, for example, biographical information, such as the customer's phone number, address, driver's license number, etc. Customer tokens may also be identifying numbers assigned to the customer by the customer's financial institution or selected by the customer in concert with the customer's financial institution, such as a PIN. In some arrangements, the customer may be associated with more than one financial institution, and the routing information database 470 may store certain tokens in association with certain of the customer's financial institutions. For example, the routing information database 470 may store a phone number for a customer in association with Bank A and the customer's driver's license number in association with Bank B. As such, the customer may show that the customer would like the requested transaction routed to Bank A by providing a phone number and to Bank B by providing a driver's license number to the POS device 402.

The authentication database 472 is structured to retrievably store information, such as authentication templates, that may be used to authenticate a customer (e.g., similar to the customer authentication database 154 described above with respect to FIG. 1). Thus, by using the authentication database 472, inquiring financial institutions may be able to identify a customer (e.g., using authentication information provided by the POS device 402) and use the customer's identity to determine where to route transaction information gathered and received by the POS device 402 (e.g., by using the routing information database 470 to identify the financial institution(s) with which the customer is associated). In various embodiments, similar to the customer authentication database 154 described above with respect to FIG. 1, the authentication database 472 stores biometric reference templates (e.g., reference templates of fingerprints, handprints, facial scans, eye scans, gaits, voiceprints, etc.) or identifying reference numbers (e.g., phone numbers, birthdays, zip codes, addresses, driver's license numbers, employee numbers, etc.). In this way, inquiring financial institutions may identify and/or authenticate a given customer using provided authentication information (e.g., provided through the POS device 402). Additionally, the authentication database 472 may store multiple authentication templates for the same customer. In some embodiments, the authentication database 472 may further store each authentication template in association with a particular financial institution of the customer.

In some arrangements, the federated registry 406 may include both the routing information database 470 and the authentication database 472, as shown in FIG. 4. In other arrangements, the federated registry 406 may include only the routing information database 470 (e.g., because the routing information database 470 stores tokens associated with various customers and includes less personal, identifying information about customers that is available for access by financial institutions than the authentication database 472).

Similar to the POS device 102, the POS device 402 is a computing device associated with a merchant and is configured to calculate the total amount owed by a customer for a given purchase and process the customer's payment for the purchase. In some embodiments, the POS device 402 may be incorporated into a merchant computing system that performs at least some of the functions described herein as performed by the POS device 102. Additionally, in some embodiments, the POS device 102 may gather information in concert with another device. As shown in FIG. 4, the POS device 402 include a network interface 410, an input/output circuit 412, an input/output device 414, and a display 416. In various embodiments, the network interface 410, the input/output circuit 412, the input/output device 414, and the display 416 are structured similarly to the network interface 110, the input/output circuit 112, the input/output device 114, and the display 116 of the POS device 102 described above with respect to FIG. 1.

The POS device 402 further includes an information gathering processing circuit 418, which is likewise similar to the information gathering processing circuit 118 of the POS device 102 described above with respect to FIG. 1. As such, in various embodiments, the information gathering processing circuit 418 includes a processor, a memory having a context gathering database, and an information gathering system having an authentication information gathering circuit, a context gathering circuit, and a dynamic determination circuit. However, as discussed above, in the passive authentication system 400 there is no preexisting relationship between the merchant associated with the POS device 402 and the customer's financial institution, and the POS device 402 is unable to otherwise determine the customer's financial institution. Accordingly, because the POS device 402 does not know where to route the gathered authentication and context information (e.g., as gathered by an authentication information gathering circuit and a context gathering circuit), in order for the requested transaction to be authenticated and authorized, the POS device 402 is configured to transmit the information to the merchant financial institution computing system 408. Additionally, the information gathering processing circuit 418 may be structured to gather additional information from the customer in order to facilitate the routing of the authentication and context information (i.e., "routing information"). For example, the information gathering processing circuit 418 may request that the customer provide to the POS device (e.g., by the input/output device 414 or the display 416) one or more routing tokens that the customer has registered with the federated registry 406.

The merchant financial institution computing system 408 is associated with or operated by a financial institution (e.g., a bank, a credit card issuer, etc.) or any other entity interested in offering payment services. In practice, the merchant financial institution computing system 408 includes server computer systems, for example, comprising one or more networked computer servers together having at least a processor and non-transitory machine readable media with instructions stored thereon.

As shown in FIG. 4, the merchant financial institution computing system 408 includes a network interface 480 and a routing determination processing circuit 482. The network interface 480 includes program logic that facilitates connection of the merchant financial institution computing system 408 to the network 106. Accordingly, the network interface 480 supports communication between the merchant financial institution computing system 408 and other components of the system 100, such as the POS device 402, the customer financial institution computing system 404, and the federated registry 406, via the network 106.

As shown, the routing determination processing circuit 482 includes a processor 484, a memory 486, and a routing determination circuit 488. The merchant financial institution computing system 408 further includes a merchant accounts database 490.

The merchant accounts database 490 is configured to retrievably store information relating to various accounts (e.g., demand deposit, credit, debit, etc.) held by merchant customers of the merchant financial institution computing system 408, including one or more accounts held by the merchant associated with the POS device 402. The stored account information may include, for example, account numbers, account types, account balances, PINs, biographical information for each customer, contact information for each customer, and so on.

The routing determination circuit 488 is configured to receive authentication information and context information from the POS device 402 and determine which financial institution to route the information to such that the requested transaction may be authenticated and authorized. Accordingly, the routing determination circuit 488 is structured to, upon receiving information from the POS device 402, examine the routing information database 470 and/or the authentication database 472 of the federated registry 406 to determine where to route the information.

In some embodiments, the merchant financial institution computing system 408 may use routing information provided by the customer to the POS device 402, such as one or more tokens that the customer has registered with the federated registry 406 for routing purposes. For example, the customer may provide to the POS device 402, and the POS device 402 may provide to the merchant financial institution computing system 408, the customer's phone number as a routing token. The routing determination circuit 488 then examines the routing information database 470 and finds that the phone number in the routing information database 470 is associated with the customer financial institution computing system 404. The routing determination circuit 488 then transmits any authentication and context information received from the POS device 402 to the customer financial institution computing system 404.

In other embodiments, the merchant financial institution computing system 408 may use the authentication information provided by the customer to the POS device 402 to determine where to route the information. For example, the customer may provide to the POS device 402, and the POS device 402 may provide to the merchant financial institution computing system 408, a fingerprint of the customer. The routing determination circuit 488 subsequently examines the authentication database 472 to find a stored fingerprint reference template that matches the received fingerprint, which in turn identifies the customer. The routing determination circuit 488 then finds the financial institution associated with the identified customer in the routing information database 470 and routes the authentication and context information to the customer financial institution computing system 404. As another example, the customer may provide to the POS device 402, and the POS device 402 may provide to the merchant financial institution computing system 408, the customer's driver's license number and birthday. The routing determination circuit 488 examines the authentication database 472 to determine the identity of the customer based on these two pieces of information. Upon identifying the customer, the routing determination circuit 488 examines the routing information database 470 and determines that two financial institutions are associated with the customer. However, within the routing information database 470, the driver's license number is specifically associated with the first financial institution, for example, the financial institution associated with the customer financial institution computing system 404. As such, the routing determination circuit 488 routes the authentication and context information to the customer financial institution computing system 404.

However, those of skill in the art will appreciate that other computing systems may perform the function of determining where to route the authentication and context information. For instance, in some arrangements, the merchant financial institution computing system 408 may transmit received authentication and context information, along with any received routing information, to a card network, to another federated system, etc., which then determines where to route the information. As an example, the customer may instruct the POS device 102 that the customer would like the transaction payment made from a particular type of credit card (e.g., Visa®, MasterCard®, American Express®, Discover®, etc.). The POS device 102 then transmits the gathered authentication and context information to the merchant financial institution computing system 408, which transmits the information to the card network associated with the specified type of credit card. The card network then determines which financial institution to route the information to (e.g., by examining the federated registry 406, by using customer tokens stored in a database maintained by the card network, etc.).

Similar to the financial institution computing system 104, the customer financial institution computing system 404 is associated with or operated by a financial institution (e.g., a bank, a credit card issuer, etc.) or any other entity interested in offering payment services. Specifically, the financial institution is a financial institution of the customer in a transaction between a customer and a merchant using the passive authentication system 400. In practice, the customer financial institution computing system 404 includes server computer systems, for example, comprising one or more networked computer servers together having at least a processor and non-transitory machine readable media with instructions stored thereon.

As shown in FIG. 4, the customer financial institution computing system 404 includes a network interface 440 and an authentication/authorization processing circuit 442. The network interface 440 is structured similarly to the network interface 140 of the financial institution computing system 104 described above with respect to FIG. 1. As shown, the authentication/authorization processing circuit 442 includes a processor 444, a memory 446, and an authentication/authorization system 448. The customer financial institution computing system 404 further includes a customer accounts database 450 and a customer profiles database 452, which are likewise structured similarly to the respective customer accounts database 150 and the customer profiles database 152 of the financial institution computing system 104 described above with respect to FIG. 1.

Similar to the authentication/authorization system 148 of the financial institution computing system 104, the authentication/authorization system 448 is configured to, for a given requested transaction, authenticate the customer, determine which of the customer's profiles to use for the transaction, and authorize a payment for the transaction using the payment type associated with the selected profile. As shown, the authentication/authorization system 448 includes a customer authentication circuit 456, a profile determination circuit 458, and a payment authorization circuit 460.

The customer authentication circuit 456 is structured similarly to the customer authentication circuit 156 described above with respect to FIG. 1, with a few differences. For one, the customer authentication circuit 456 is structured to indirectly receive authentication information and send authentication notifications to the POS device 402 via the merchant financial institution computing system 408. Furthermore, the customer authentication circuit 456 is structured to authenticate the customer by comparing the received authentication information to authentication templates stored in the authentication database 472 of the federated registry 406.

Likewise, the profile determination circuit 458 is structured similarly to the profile determination circuit 158 described above with respect to FIG. 1, except that the profile determination circuit 458 is also structured to indirectly receive context information via the merchant financial institution computing system 408. In the same way, the payment authorization circuit 460 is structured similarly to the payment authorization circuit 160 described above with respect to FIG. 1, except that the payment authorization circuit 460 is structured to indirectly send authorization notifications to the POS device 402 via the merchant financial institution computing system 408. The payment authorization circuit 460 is also structured to only transmit the payment information to the merchant financial institution computing system 408.

Figure 5:
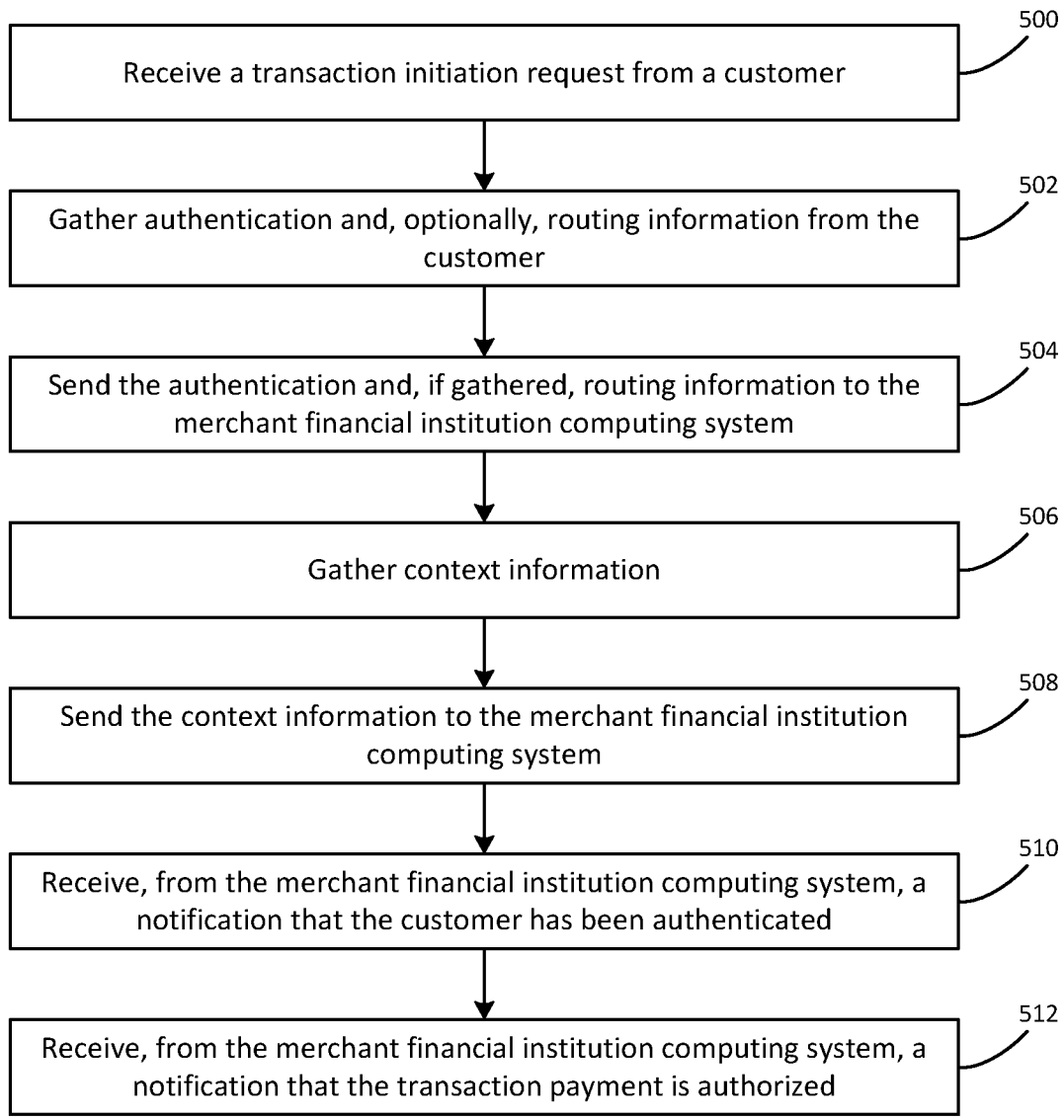
FIG. 5 is a flow diagram illustrating a method of passively authenticating a customer and authorizing a payment by the system of FIG. 4, according to an embodiment.
Figure 6:
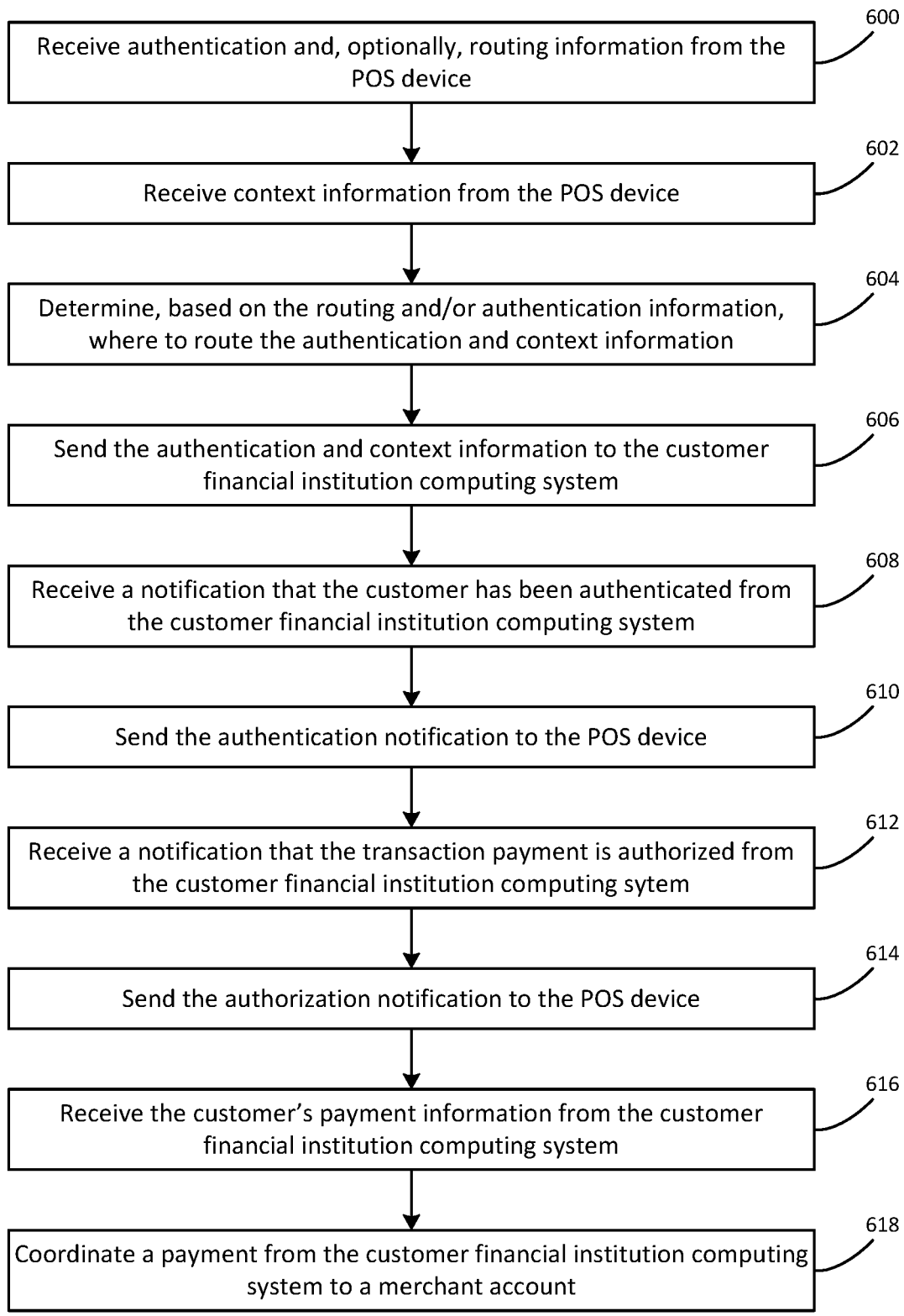
FIG. 6 is a flow diagram illustrating a method of passively authenticating a customer and authorizing a payment by the system of FIG. 4, according to an embodiment.
Figure 7:
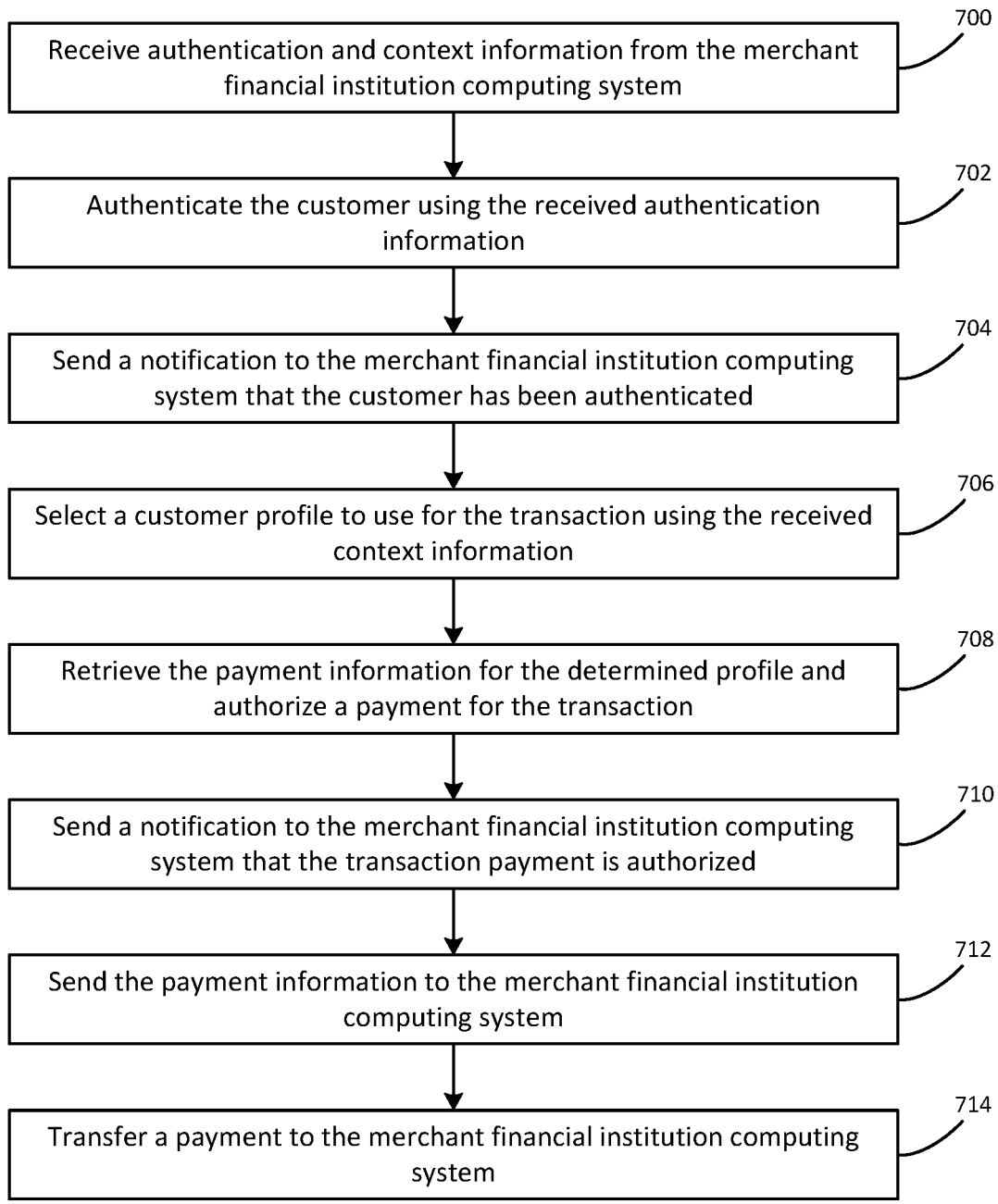
FIG. 7 is a flow diagram illustrating a method of passively authenticating a customer and authorizing a payment by the system of FIG. 4, according to an embodiment.

Referring now to FIGS. 5-7, flow diagrams illustrating a method of passively authenticating a customer and authorizing a payment by the passive authentication system 400 are shown, according to an example embodiment. Referring first to FIG. 5, the method of passively authenticating a customer and authorizing a payment is shown from the perspective of the POS device 402.

At step 500, the POS device 402 receives a transaction initiation request from a customer. For example, the customer scans items the customer wishes to purchase through the input/output device 414 (e.g., a barcode scanner) of the POS device 402 and selects an option through the POS device (e.g., by the display 416) to initiate a payment for the desired purchase.

At step 502, the POS device 402 gathers authentication information and, optionally, routing information from the customer. As discussed above, the authentication information may be a biometric of the customer (e.g., a fingerprint, a handprint, a facial scan, an eye scan, a gait, a voiceprint, etc.) or an identifying number associated with the customer (e.g., the customer's phone number, birthday, zip code, address, driver's license number, employee number, etc.). As further discussed above, the routing information may be information (e.g., tokens) that customers register with the federated registry 406 for routing purposes, information that the federal registry gathers from financial institutions for routing purposes, and so on. In some embodiments, the POS device 402 may gather certain routing and/or authentication information from or about the customer. In other embodiments, the POS device 402 may allow the customer to select what routing and/or authentication information the customer will provide to the POS device 402. Subsequently, at step 504, the POS device 402 sends the gathered authentication information and, if gathered, routing information to the merchant financial institution computing system 408.

At step 506, the POS device 402 gathers context information for the transaction. For example, the POS device 402 may gather information about the merchant operating the POS device 402, what the customer is wearing (e.g., the type of clothes the customer is wearing), and individual proximate to the customer during the transaction, what the customer is holding (e.g., an accessory the customer is carrying), a location of the transaction, at least one item the customer is purchasing, a total cost of the transaction, the time of the transaction, the day-of-week of the transaction, and so on. In some embodiments, the POS device 402 may dynamically determine what context information to gather. At step 508, after gathering the context information, the POS device 402 sends the context information to the merchant financial institution computing system 408.

At step 510, the POS device 102 receives, from the merchant financial institution computing system 408, a notification that the customer has been authenticated by the customer financial institution computing system 404. In some embodiments, the POS device 402 may gather and send the context information (i.e., perform steps 506 and 508) at the same time as or shortly after the POS device 402 gathers and sends the routing and/or authentication information (i.e., performs steps 502 and 504). In other embodiments, the POS device 402 may gather and send the context information only after receiving the authentication notification (i.e., perform steps 506 and 508 after step 510). Additionally, in various embodiments, upon receiving the authentication notification, the POS device 402 displays the notification (e.g., on the display 416) to the customer and/or to an employee to verify that the customer has been successfully authenticated.

Finally, at step 512, the POS device 402 receives, from the merchant financial institution computing system 408, a notification that the transaction has been authorized by the customer financial institution computing system 404. In various embodiments, the POS device 402 then displays the notification (e.g., on the display 416) to the customer and/or to the employee to verify that the transaction has been authorized and approved.

Referring now to FIG. 6, the method of passively authenticating a customer and authorizing a payment is shown from the perspective of the merchant financial institution computing system 408. At step 600, the merchant financial institution computing system 408 receives authentication information and, optionally, routing information for a customer from the POS device 402. At step 602, the merchant financial institution computing system 408 additionally receives context information from the POS device 402.

At step 604, the merchant financial institution computing system 408 determines, based on the routing and/or authentication information, where to route the authentication and context information. As discussed above, to determine where to route the information, the merchant financial institution computing system 408 examines information stored in the federated registry 406. In one embodiment, the merchant financial institution computing system 408 may use received routing information, such as one or more routing tokens, to determine which financial institution is associated with the routing information in the routing information database 470. In another embodiment, the merchant financial institution computing system 408 may use received authentication information to determine the identity of the customer, using the authentication database 472, and find the financial institution associated with the customer or associated specifically with the received authentication information, using the routing information database 470. Regardless of the method used, at step 604, the merchant financial institution computing system 408 determines which financial institution to route the information received from the POS device 402 to. In the example of FIG. 4, the financial institution is the customer financial institution computing system 404. Accordingly, at step 606, the merchant financial institution computing system 408 sends the context information to the customer financial institution computing system 404.

At step 608, assuming that the customer is successfully authenticated by the customer financial institution computing system 404, the merchant financial institution computing system 408 receives a notification that the customer has been authenticated from the customer financial institution computing system 404. At step 610, the merchant financial institution computing system 408 sends the authentication notification to the POS device 402. Additionally, at step 612, assuming that the transaction payment is authorized by the customer financial institution computing system 404 (e.g., the customer has enough credit left to cover the transaction payment), the customer financial institution computing system 404 receives a notification that the transaction payment is authorized from the customer financial institution computing system 404. Consequently, at step 614, the merchant financial institution computing system 408 sends the authorization notification to the POS device 402.

At step 616, the merchant financial institution computing system 408 receives the customer's payment information from the customer financial institution computing system 404. Thus, at step 618, the merchant financial institution computing system 408 coordinates a payment from the customer financial institution computing system 404 to a merchant account held at the merchant financial institution. In various embodiments, the merchant financial institution computing system 408 then updates the account information for the merchant in the merchant accounts database 490 to reflect the payment.

Referring now to FIG. 7, the method of passively authenticating a customer and authorizing a payment is shown from the perspective of the customer financial institution computing system 404. At step 700, the customer financial institution computing system 404 receives authentication and context information, collected by the POS device 402, from the merchant financial institution computing system 408. At step 702, the customer financial institution computing system 404 authenticates the customer using the received authentication information. In various embodiments, the computing system 404 authenticates the customer by determining whether the received authentication information matches one or more authentication templates stored in the authentication database 472 of the federated registry 406. In some embodiments, the computing system 404 may authenticate the customer with a single piece of authentication information, while in other embodiments, the computing system 404 may require more than one piece of authentication information in order to authenticate the customer.

Assuming the customer is successfully authenticated, at step 704, the customer financial institution computing system 404 sends a notification to the merchant financial institution computing system 408 indicating that the customer has been authenticated. Alternatively, if the authentication is not successful, then the customer financial institution computing system 404 may send a notification to the merchant financial institution computing system 408 indicating that the customer has not been successfully authenticated. The notification may further include an indication that the transaction is denied or instructions for the POS device 402 to request new authentication information from the customer.

At step 706, the customer financial institution computing system 404 selects the customer profile to use for the transaction using the received context information. In making this selection, the computing system 404 examines the profiles stored for the customer in the customer profiles database 452. In some embodiments, the computing system 404 may determine which profile to used based on which profile classification (e.g., a personal profile, a business profile, a club profile, an organization profile, a cash rewards profile, a travel profile, etc.) best matches the received context information. In other embodiments, the computing system 404 may determine which profile to use based on which profile rules, predetermined by the customer, best match the context information.

At step 708, the customer financial institution computing system 404 retrieves the payment information for the selected profile from step 706. For example, the computing system 404 retrieves the payment account information from the customer accounts database 450. Further, at step 708, the computing system 404 authorizes payment for the transaction (e.g., by checking to ensure that the customer has enough credit left to cover the transaction, by checking to ensure that the customer has enough money in a bank account to cover the transaction, etc.). Subsequently, at step 710, the computing system 404 sends a notification to the merchant financial institution computing system 408 indicating that the transaction payment is authorized.

At step 712, the customer financial institution computing system 404 sends the payment information to the merchant financial institution computing system 408. Finally, at step 714, the customer financial institution computing system 404 transfers the payment transaction payment to the merchant financial institution computing system 408 to be deposited into an account held by the merchant at the merchant financial institution. In various embodiments, the computing system 404 then updates information about the customer's account from which the payment was taken in the customer accounts database 450.

Those of skill in the art will appreciate, however, that methods of processing payments through a passive authentication system as described herein may comprise fewer or additional steps, or portions of the steps described herein may be performed by a different computing system. For example, some of the steps described with respect to FIG. 6 may instead be performed by a card network, a federated system, etc.

Figure 8:
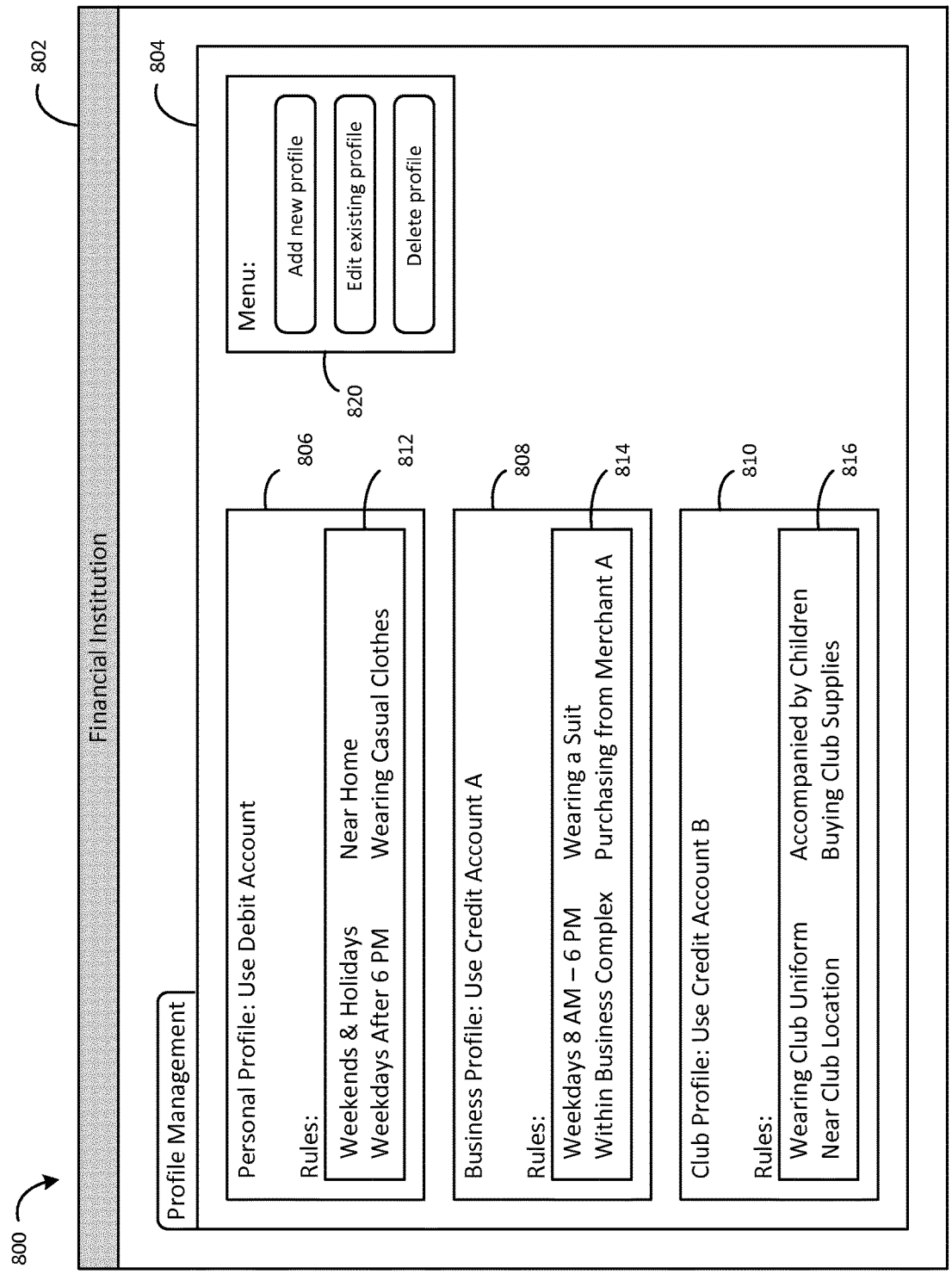
FIG. 8 is an image of a graphical user interface that may be used in connection with the flow diagrams of FIGS. 2, 3, and 5-7, according to an example embodiment.

Referring now to FIG. 8, an image of a graphical user interface 800 that may be used in connection with the flow diagrams of FIGS. 2, 3, and 5-7 is shown, according to an example embodiment. The user interface 800 is shown as part of a webpage, program, application for a smartphone or tablet computer, etc. run by or through a financial institution 802 (e.g., the financial institution associated with the financial institution computing system 104 or the customer financial institution computing system 404). Included in the user interface 800 is a profile management page 804 through which a customer may create and manage payment profiles. In the example of FIG. 8, the customer has three payment profiles: a personal profile 806, a business profile 808, and a club profile 810 (e.g., associated with a club or organization of which the customer is a member). As shown in FIG. 7, the customer has specified a payment account or type for each profile. For the personal profile 806, the customer has specified that the customer's debit account should be used. For the business profile 808, the customer has specified that the customer's credit account A should be used. Finally, for the club profile 810, the customer has specified that the customer's credit account B should be used. Accordingly, if the computing system associated with the financial institution 802 for example determines that the personal profile 806 should be used for a given transaction based on received context information, then the computing system will authorize payment for the transaction from the customer's debit account. If, on the other hand, the computing system determines that the club profile 810 should be used, then the computing system will authorize payment for the transaction from credit account B.

Additionally, in the example of FIG. 8, the customer has provided rules to guide the financial institution 802 in deciding which payment profile to use. Rules for the personal profile 806 are shown in section 812, rules for the business profile 808 are shown in section 814, and rules for the club profile are shown in section 816. Thus, using the rules in sections 812, 814, and 816, for a transaction occurring within three miles of the customer's home and on a weekend, the computing system associated with the financial institution 802 may determine that the personal profile 806 should be used for the transaction. On the other hand, for a transaction where the context information shows that the customer is accompanied by children and is wearing a club uniform, the computing system may determine that the club profile 810 should be used.

The customer may edit profiles shown on the profile management page 804 through a menu 820. As shown, the menu 820 includes an "Add a new profile" button, an "Edit existing profile" button, and a "Delete profile" button. Accordingly, the customer may add an additional profile to the profile management page 804 by selecting the "Add a new profile" button. For example, if the customer selects the "Add a new profile" button, the customer may be redirected to a page whereon the customer inputs the profile classification (e.g., personal, business, club, organization, religious group, sport, travel, cash rewards, etc.), the payment account for the profile (e.g., demand deposit, credit, debit, gift card, etc.), and/or rules for the profile. The customer may edit the personal profile 806, the business profile 808, and/or the club profile 810 by selecting the "Edit existing profile" button. For example, selecting the "Edit existing profile" button may redirect the customer to an editing page whereon the customer may modify the rules or the payment account for the personal profile 806, the business profile 808, and/or the club profile 810. Finally, the customer may delete a profile by selecting the "Delete profile" button. For example, if the customer selects the "Delete profile" button, the customer may be able to select which of the personal profile 806, business profile 808, and/or the club profile 810 that the customer would like to delete.

Those of skill in the art will appreciate, however, that the user interface 800 is merely an example user interface and that other types or configurations of user interfaces may be used by a computing system associated with a financial institution for interacting with a customer of a passive authentication system.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

As used herein, a processor is implemented as a general-purpose processor, an application specific integrated circuit (ASIC), one or more field programmable gate arrays (FPGAs), a digital signal processor (DSP), a group of processing components, or other suitable electronic processing components. Additionally, in some arrangements, a "processor," as used herein, is implemented as one or more processors. In certain embodiments, the one or more processors are structured to perform or otherwise execute certain operations independent of one or more co-processors. In other example embodiments, two or more processors are coupled via a bus to enable independent, parallel, pipelined, or multi-threaded instruction execution. In some arrangements, the one or more processors take the form of a single core processor, multi-core processor (e.g., a dual core processor, triple core processor, or quad core processor), microprocessor, etc. In some embodiments, the one or more processors are external to the apparatus, for example, the one or more processors are a remote processor (e.g., a cloud based processor). Alternatively, or additionally, the one or more processors are internal and/or local to the apparatus. Accordingly, an exemplary system for implementing the overall system or portions of the embodiments might include a general purpose computing computers in the form of computers, including a processing unit, a system memory, and a system bus that couples various system components including the system memory to the processing unit.

Additionally, as used herein, a memory includes one or more memory devices including non-transient volatile storage media, non-volatile storage media, non-transitory storage media (e.g., one or more volatile and/or non-volatile memories), etc. In some embodiments, the non-volatile media takes the form of ROM, flash memory (e.g., flash memory such as NAND, 3D NAND, NOR, or 3D NOR), EEPROM, MRAM, magnetic storage, hard discs, optical discs, etc. In some embodiments, the volatile storage media takes the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. In various arrangements, each respective memory device is operable to maintain or otherwise store information relating to the operations performed by one or more associated circuits, including processor instructions and related data (e.g., database components, object code components, or script components), in accordance with the example embodiments described herein.

It should be understood that a "network interface," as used herein, includes any of a cellular transceiver (e.g., Code Division Multiple Access (CDMA), Global System for Mobile Communications (GSM), Long-Term Evolution (LTE), etc.), a wireless network transceiver (e.g., 802.11X, ZigBee, or Bluetooth), or a combination thereof (e.g., both a cellular transceiver and a Bluetooth transceiver). In some arrangements, a network interface includes hardware and machine-readable media sufficient to support communication over multiple channels of data communication. Further, in some arrangements, the network interface includes cryptography capabilities to establish a secure, or relatively secure, communication session between the device including the network interface and other devices of the system 100 via the network 106. In this regard, personal information about clients, financial data, and other types of data is encrypted and transmitted to prevent, or substantially prevent, the threat of hacking.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of authenticating and authorizing a payment, comprising:
    receiving, by a financial institution computing system, a biometric of the customer gathered by a point-of-sale device from a customer initiating a payment for a transaction via the point-of-sale device;
    authenticating, by the computing system, the biometric of the customer based on accessing a customer authentication database and comparing the biometric to one or more stored authentication templates;
    determining, by the computing system, more than one piece of authentication information is required to authorize the payment for the transaction, wherein the biometric is a piece of authentication information;
    transmitting, by the computing system to the point-of-sale device, a request for additional non-biometric authentication information from the customer;
    receiving, by the computing system, the additional non-biometric authentication information of the customer gathered by the point-of-sale device;
    authenticating, by the computing system, the additional non-biometric authentication information based on accessing the customer authentication database and comparing the additional non-biometric authentication information to the one or more authentication templates;

transmitting, by the computing system to the point-of-sale device, a notification indicating the customer is authenticated;

receiving, by the computing system, context information gathered by the point-of-sale device, wherein the context information comprises a plurality of context elements that describe a context of the transaction, and wherein the point-of-sale device limits the gathering of content information based on a characteristic of the transaction;

in response to authenticating the customer using the received biometric of the customer and the additional non-biometric authentication information, selecting, by the computing system, a customer payment profile from a plurality of customer payment profiles identified by the biometric of the customer and to use for the transaction, wherein each customer payment profile is associated with a plurality of rules and each rule is associated with a potential context element, and wherein selecting the customer payment profile from the plurality of customer payment profiles comprises determining whether the potential context element of each rule matches the received plurality of context elements and selecting the customer payment profile with the highest number of rules of the plurality of rules matching the received plurality of context elements;

authorizing, by the computing system, the payment for the transaction from the payment account associated with the selected customer payment profile; and sending to the point-of-sale device, by the computing system, a notification that the customer has been authenticated and that the payment for the transaction has been authorized.

2. The method of claim 1, wherein authenticating the customer using the received biometric of the customer comprises:

determining, by the computing system, whether the received biometric of the customer matches at least one of the one or more authentication templates.

3. The method of claim 2, wherein the one or more authentication templates are stored in a federated registry.

4. The method of claim 1, wherein the plurality of context elements comprises at least one of:
 a merchant operating the point-of-sale device;
 a type of clothes the customer is wearing;
 an individual proximate the customer during the transaction;
 an accessory the customer is carrying;
 a location of the transaction;
 at least one item the customer is purchasing through the transaction;
 a total cost of the transaction;
 a time of the transaction; or
 a day-of-week of the transaction.

5. The method of claim 1,
 wherein the notification is sent to the point-of-sale device via at least one of the merchant financial institution computing system and the card network.

6. The method of claim 1, wherein a financial institution associated with the financial institution computing system and a merchant associated with the point-of-sale device have a preexisting relationship.

7. A system for authenticating and authorizing a payment, the system comprising a processor coupled to a non-transitory storage medium including instructions stored thereon that, when executed by the processor, cause the system to:

receive a biometric of the customer gathered by a point-of-sale device from a customer initiating a payment for a transaction via the point-of-sale device;

authenticate the customer using the received biometric of the customer based on accessing a customer authentication database and comparing the biometric to one or more stored authentication templates;

determine additional non-biometric authentication information is required to authenticate the customer;

determine more than one piece of authentication information is required to authorize the payment for the transaction, wherein the biometric is a piece of authentication information;

transmit, to the point-of-sale device, a request for additional non-biometric authentication information from the customer;

receive the additional non-biometric authentication information of the customer gathered by the point-of-sale device;

authenticate the additional non-biometric authentication information based on accessing the customer authentication database and comparing the additional non-biometric authentication information to the one or more authentication templates;

transmit, to the point-of-sale device, a notification indicating the customer is authenticated;

receive context information gathered by the point-of-sale device, wherein the context information comprises a plurality of context elements that describe a context of the transaction, and wherein the point-of-sale device limits the gathering of content information based on a characteristic of the transaction;

in response to authenticating the customer using the received biometric of the customer and the additional non-biometric authentication information, select a customer payment profile from a plurality of customer payment profiles identified by the biometric of the customer and to use for the transaction, wherein each customer payment profile is associated with a plurality of rules and each rule is associated with a potential context element, and wherein the system selects the customer payment profile from the plurality of customer payment profiles by determining whether the potential context element of each rule matches the received plurality of context elements and selecting the customer payment profile with the highest number of rules of the plurality of rules matching the received plurality of context elements;

authorize the payment for the transaction from the payment account associated with the selected customer payment profile; and send, to the point-of-sale device, a notification that the customer has been authenticated and that the payment for the transaction has been authorized.

8. The system of claim 7, wherein the system matches the biometric of the customer with at least one of a stored biometric reference template by:
 determining whether the received biometric matches the at least one of the one or more biometric reference template.

9. The system of claim 8, wherein the one or more authentication templates are stored in a federated registry.

10. The system of claim 7, wherein the plurality of context elements comprise at least one of:
 a merchant operating the point-of-sale device;

a type of clothes the customer is wearing;
an individual proximate the customer during the transaction;
an accessory the customer is carrying;
a location of the transaction;
at least one item the customer is purchasing through the transaction;
a total cost of the transaction;
a time of the transaction; or
a day-of-week of the transaction.

11. The system of claim 7, wherein the notification is sent to the point-of-sale device via at least one of the merchant financial institution computing system and the card network.

12. The system of claim 7, wherein a financial institution associated with the system and a merchant associated with the point-of-sale device have a preexisting relationship.

13. A method of authenticating and authorizing a payment, comprising:
gathering, by a biometric scanner of a point-of-sale device, a biometric of the customer from a customer initiating a payment for a transaction by the point-of-sale device;
authenticating, by a financial institution computing system, the biometric of the customer based on accessing a customer authentication database and comparing the biometric to one or more stored authentication templates;
determining, by the financial institution computing system, more than one piece of authentication information is required to authorize the payment for the transaction, wherein the biometric is a piece of authentication information;
gathering, by the point-of-sale device, additional non-biometric authentication information of the customer;
authenticating, by the point of sale device by financial institution computing system, the additional non-biometric authentication information based on accessing the customer authentication database and comparing the additional non-biometric authentication information to the one or more authentication templates;
gathering, by a plurality of sensors of the point-of-sale device, context information, the context information comprising a plurality of context elements that describe a context of the transaction, wherein the point-of-sale device limits the gathering of content information based on a characteristic of the transaction; and
in response to authenticating the customer using the received biometric of the customer and the additional non-biometric authentication information, selecting, by the point-of-sale device, a customer payment profile from a plurality of customer payment profiles identified by the biometric of the customer and to use for the transaction, wherein each customer payment profile is associated with a plurality of rules and each rule is associated with a potential context element, and wherein selecting the customer payment profile from the plurality of customer payment profiles comprises determining whether the potential context element of each rule matches the received plurality of context elements and selecting the customer payment profile with the highest number of rules of the plurality of rules matching the received plurality of context elements;
authorizing, by the financial institution computing system, the payment for the transaction from the payment account associated with the selected customer payment profile; and
displaying, by the point-of-sale device, a notification to the customer, wherein the notification indicates the payment for the transaction was authenticated and authorized.

14. The method of claim 13, wherein the plurality of gathered context elements further comprises at least one of:
a merchant operating the point-of-sale device;
a location of the transaction;
at least one item the customer is purchasing through the transaction;
a total cost of the transaction;
a time of the transaction; or
a day-of-week of the transaction.

15. The method of claim 13, further comprising:
gathering, by the point-of-sale device, one or more routing tokens.

16. The method of claim 1, wherein selecting the customer payment profile with the highest number of rules of the plurality of rules matching the received plurality of context elements comprises calculating a percentage of the plurality of rules for each customer payment profile that match the received plurality of context elements and selecting the customer payment profile with a highest percentage.

17. The system of claim 7, wherein the system selects the customer payment profile with the highest number of rules of the plurality of rules matching the received plurality of context elements by calculating a percentage of the plurality of rules for each customer payment profile that match the received plurality of context elements and selecting the customer payment profile with a highest percentage.

* * * * *